US010701719B2

(12) United States Patent
Dinan

(10) Patent No.: US 10,701,719 B2
(45) Date of Patent: *Jun. 30, 2020

(54) SCHEDULING RESOURCE ALLOCATION IN WIRELESS NETWORK

(71) Applicant: Comcast Cable Communication, LLC, Philadelphia, PA (US)

(72) Inventor: Esmael Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,986

(22) Filed: Feb. 21, 2019

(65) Prior Publication Data
US 2019/0261396 A1 Aug. 22, 2019

Related U.S. Application Data

(63) Continuation of application No. 15/889,650, filed on Feb. 6, 2018, now Pat. No. 10,264,598, which is a
(Continued)

(51) Int. Cl.
*H04W 72/00* (2009.01)
*H04W 72/12* (2009.01)
(Continued)

(52) U.S. Cl.
CPC ........... *H04W 72/1268* (2013.01); *H04L 5/00* (2013.01); *H04L 5/001* (2013.01); *H04L 5/0032* (2013.01);
(Continued)

(58) Field of Classification Search
CPC ..... H04W 72/04; H04W 76/02; H04W 16/10; H04W 36/30; H04W 36/18; H04W 36/08;
(Continued)

(56) References Cited

U.S. PATENT DOCUMENTS 9,713,087 B2 * 7/2017 Asterjadhi ........ H04W 52/0274
9,736,795 B2    8/2017 Dinan
(Continued)

FOREIGN PATENT DOCUMENTS

KR    20140058599 A    5/2014
WO    2013162247 A1   10/2013
(Continued)

OTHER PUBLICATIONS

3GPP TSG-RAN WG2 Meeting #89 R2-150129, Athens, Greece, Feb. 9-13, 2015, Agenda Item: 7.2, Source: Nokia Networks, Nokia Corporation, Title: SR on SCell, WID/SID: LTE_CA_enh_b5C-Core Release 13.
3GPP TSG-RAN WG2 Meeting #89 R2-150278, Athens, Greece, Feb. 9-Feb. 13, 2015, Source: Microsoft Corporation, Title: SCell PUCCH for CA.
(Continued)

*Primary Examiner* — Danh C Le
(74) *Attorney, Agent, or Firm* — Banner & Witcoff, Ltd.

(57) ABSTRACT

Methods, apparatuses, and systems are described for wireless communications. Cells may be grouped into a plurality of cell groups. A wireless device may determine that a secondary cell has an invalid scheduling request (SR) resource based on various conditions. The wireless device may transmit a preamble via a primary cell if the secondary cell has an invalid SR resource.

52 Claims, 23 Drawing Sheets

Related U.S. Application Data continuation of application No. 15/159,920, filed on May 20, 2016, now Pat. No. 9,894,681.

(60) Provisional application No. 62/174,606, filed on Jun. 12, 2015.

(51) Int. Cl.
  *H04L 5/00* (2006.01)
  *H04W 72/04* (2009.01)
  *H04M 1/725* (2006.01)

(52) U.S. Cl.
  CPC .......... *H04L 5/0053* (2013.01); *H04L 5/0091* (2013.01); *H04L 5/0023* (2013.01); *H04M 1/72519* (2013.01); *H04W 72/0406* (2013.01)

(58) Field of Classification Search
  CPC . H04W 88/02; H04W 28/04; H04M 1/72519; H04M 1/72522; H04L 5/0007
  USPC .................. 455/450, 550.1, 437; 370/329
  See application file for complete search history.

(56) References Cited

U.S. PATENT DOCUMENTS

| | | | |
|---|---|---|---|
| 9,872,336 B2 | 1/2018 | Dinan | |
| 9,894,681 B2 | 2/2018 | Dinan | |
| 2009/0257390 A1 | 10/2009 | Ji et al. | |
| 2009/0290550 A1 | 11/2009 | Bhattad et al. | |
| 2010/0291937 A1 | 11/2010 | Hu et al. | |
| 2010/0303035 A1 | 12/2010 | Gao et al. | |
| 2010/0309876 A1 | 12/2010 | Khandekar et al. | |
| 2011/0081932 A1 | 4/2011 | Astely et al. | |
| 2011/0134774 A1 | 6/2011 | Pelletier et al. | |
| 2011/0228731 A1 | 9/2011 | Luo et al. | |
| 2011/0243016 A1 | 10/2011 | Zhang et al. | |
| 2011/0249634 A1 | 10/2011 | Lee et al. | |
| 2011/0305179 A1 | 12/2011 | Wang et al. | |
| 2012/0039275 A1 | 2/2012 | Chen et al. | |
| 2012/0039279 A1 | 2/2012 | Chen et al. | |
| 2012/0069802 A1 | 3/2012 | Chen et al. | |
| 2012/0082088 A1 | 4/2012 | Dalsgaard et al. | |
| 2012/0083284 A1 | 4/2012 | Harrison et al. | |
| 2012/0113913 A1 | 5/2012 | Tiirola et al. | |
| 2012/0182879 A1 | 7/2012 | Tamura et al. | |
| 2012/0213163 A1 | 8/2012 | Lee et al. | |
| 2012/0257570 A1 | 10/2012 | Jang et al. | |
| 2012/0329461 A1 | 12/2012 | Teyeb et al. | |
| 2013/0010619 A1 | 1/2013 | Fong et al. | |
| 2013/0028198 A1 | 1/2013 | Yamada | |
| 2013/0094392 A1 | 4/2013 | Kim et al. | |
| 2013/0114472 A1 | 5/2013 | Tamaki et al. | |
| 2013/0155914 A1 | 6/2013 | Wang et al. | |
| 2013/0188570 A1 | 7/2013 | Zhao et al. | |
| 2013/0188612 A1 | 7/2013 | Dinan | |
| 2013/0215848 A1 | 8/2013 | Kato et al. | |
| 2013/0223301 A1 | 8/2013 | Lee et al. | |
| 2013/0235768 A1 | 9/2013 | Earnshaw et al. | |
| 2013/0250893 A1 | 9/2013 | Li et al. | |
| 2013/0250901 A1 | 9/2013 | Oizumi et al. | |
| 2013/0272232 A1 | 10/2013 | Dinan | |
| 2013/0272233 A1* | 10/2013 | Dinan | H04W 72/0406 370/329 |
| 2013/0272241 A1 | 10/2013 | Ohta et al. | |
| 2013/0279433 A1 | 10/2013 | Dinan | |
| 2013/0301446 A1 | 11/2013 | Chen et al. | |
| 2014/0016593 A1 | 1/2014 | Park et al. | |
| 2014/0036659 A1 | 2/2014 | Gao | |
| 2014/0036664 A1 | 2/2014 | Han et al. | |
| 2014/0050113 A1 | 2/2014 | Rosa et al. | |
| 2014/0056220 A1 | 2/2014 | Poitau et al. | |
| 2014/0092865 A1 | 4/2014 | Heo et al. | |
| 2014/0133373 A1 | 5/2014 | Han et al. | |
| 2014/0161060 A1 | 6/2014 | Nam et al. | |
| 2014/0161117 A1 | 6/2014 | Sebire et al. | |
| 2014/0269595 A1 | 9/2014 | Lee et al. | |
| 2014/0348078 A1* | 11/2014 | Kim | H04W 52/146 370/329 |
| 2014/0349713 A1 | 11/2014 | Yamada | |
| 2015/0003418 A1 | 1/2015 | Rosa et al. | |
| 2015/0016350 A1 | 1/2015 | Moulsley et al. | |
| 2015/0078286 A1 | 3/2015 | Kim et al. | |
| 2015/0098340 A1 | 4/2015 | Oizumi | |
| 2015/0098400 A1* | 4/2015 | Lee | H04W 56/0045 370/329 |
| 2015/0110029 A1 | 4/2015 | Hwang et al. | |
| 2015/0117342 A1 | 4/2015 | Loehr et al. | |
| 2015/0124670 A1 | 5/2015 | Park | |
| 2015/0146588 A1 | 5/2015 | Park | |
| 2015/0181590 A1 | 6/2015 | Park | |
| 2015/0215079 A1 | 7/2015 | Park | |
| 2015/0215977 A1 | 7/2015 | Yamazaki | |
| 2015/0223213 A1 | 8/2015 | Moon et al. | |
| 2015/0245307 A1 | 8/2015 | Chen et al. | |
| 2015/0245347 A1 | 8/2015 | Yi et al. | |
| 2015/0271811 A1 | 9/2015 | Kim et al. | |
| 2015/0282020 A1 | 10/2015 | Pajukoski et al. | |
| 2015/0289179 A1* | 10/2015 | Liu | H04W 48/20 370/331 |
| 2015/0312930 A1* | 10/2015 | Han | H04W 72/1247 370/336 |
| 2015/0319754 A1 | 11/2015 | Ishida et al. | |
| 2015/0327230 A1 | 11/2015 | Takeda et al. | |
| 2016/0014753 A1 | 1/2016 | Wu et al. | |
| 2016/0021646 A1 | 1/2016 | Hu et al. | |
| 2016/0044617 A1 | 2/2016 | Vajapeyam et al. | |
| 2016/0044655 A1 | 2/2016 | Park et al. | |
| 2016/0044737 A1 | 2/2016 | Kwon | |
| 2016/0066284 A1 | 3/2016 | Kwon et al. | |
| 2016/0100397 A1* | 4/2016 | Wen | H04W 72/1284 |
| 2016/0150485 A1 | 5/2016 | Yi et al. | |
| 2016/0157191 A1 | 6/2016 | Yokomakura et al. | |
| 2016/0192388 A1 | 6/2016 | Ekpenyong et al. | |
| 2016/0205681 A1 | 7/2016 | Kim et al. | |
| 2016/0227541 A1 | 8/2016 | Damnjanovic et al. | |
| 2016/0241377 A1 | 8/2016 | Takeda et al. | |
| 2016/0242153 A1 | 8/2016 | Chen et al. | |
| 2016/0262118 A1 | 9/2016 | Kim et al. | |
| 2016/0277987 A1 | 9/2016 | Chen et al. | |
| 2016/0285716 A1 | 9/2016 | Pelletier et al. | |
| 2016/0286555 A1 | 9/2016 | Papasakellariou | |
| 2016/0302177 A1 | 10/2016 | Kwon et al. | |
| 2016/0365959 A1 | 12/2016 | Dinan | |
| 2016/0366675 A1 | 12/2016 | Dinan | |
| 2016/0366681 A1 | 12/2016 | Dinan | |
| 2016/0381681 A1 | 12/2016 | Nogami et al. | |
| 2017/0006559 A1 | 1/2017 | Kim et al. | |
| 2017/0064541 A1 | 3/2017 | Uchino et al. | |
| 2017/0111159 A1 | 4/2017 | Lee et al. | |
| 2017/0118658 A1 | 4/2017 | Hwang et al. | |
| 2017/0141901 A1 | 5/2017 | Rico Alvarino et al. | |
| 2017/0251454 A1 | 8/2017 | Yang et al. | |
| 2017/0353965 A1 | 12/2017 | Zhang | |
| 2017/0367103 A1* | 12/2017 | Suzuki | G06F 21/31 |
| 2017/0367115 A1 | 12/2017 | Sebire | |
| 2018/0014285 A1 | 1/2018 | Nishio et al. | |
| 2018/0014291 A1 | 1/2018 | Takeda et al. | |
| 2018/0020473 A1* | 1/2018 | Suzuki | H04W 72/04 |
| 2018/0027548 A1* | 1/2018 | Suzuki | H04W 72/04 370/329 |
| 2018/0063832 A1 | 3/2018 | Yamada et al. | |
| 2018/0131494 A1 | 5/2018 | Li et al. | |

FOREIGN PATENT DOCUMENTS

| | | |
|---|---|---|
| WO | 2013/179590 A1 | 12/2013 |
| WO | 2016157797 A1 | 10/2016 |

(56) References Cited

OTHER PUBLICATIONS

3GPP TSG-RAN2 Meeting #64bis, Ljubljana, Slovenia, Jan. 12-16, 2009, R2-090659, Title: S PRC Parameters for MAG and RLG, Source to WG: Nokia Siemens Networks, Nokia Corporation, Source to TSG: R2, Work item code: LTE-L23.
3GPP TSG-RAN2#72 meeting Tdoc XR2-106513, Jacksonville, U.S. Nov. 15-19, 2010, Agenda Item: 7.1.4.3, Source: Samsung, Title: SR handling in CA.
Jan. 24 2018—Japanese Office Action—JP 2017-546843.
Apr. 5, 2018—Korean Office Action—KR 2017-7025399.
3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.
3GPP TSG RAN WG2 Meeting #89 R2-150150, Athens, Greece, Feb. 9-13, 2015, Source: ZTE, Title: Activation/Deactivation for SCell carrying PUCCH.
3GPP TSG-RAN WG2 #87, Aug. 18-22, 2014, Dresden, Germany, R2-143073, Update of R2-141967, Source: NTT Docomo, Inc, Title: Support of PUCCH on SCell for CA—RAN2 aspects.
3GPP TSG-RAN WG2 Meeting #72bis, Dublin, Ireland, Jan. 17-21, 2011, R2-110113, Agenda item: 7.1.4, Source: Huawei, Title: CQI Reporting at Activation.
3GPP TSG-RAN WG2 Meeting #87, Aug. 18-22, 2014, Dresden, Germany, R2-143117, Agenda Item: 6.1.2, Source: Samsung, Title: Discussion on PHR Triggering due to SCell activation.
3GPP TSG-RAN WG2 Meeting #89 R2-150186, Athens, Greece, Feb. 9-13, 2015, Source: Nokia Corporation, Nokia Networks, Title: PUCCH SCell RLM and activation/deactivation.
3GPP TSG-RAN WG2 Meeting #89 R2-150277, Athens, Greece, Feb. 9-13, 2015, Source: KT Corp., Title: Activation/deactivation of SCell carrying PUCCH.
3GPP TSG-RAN WG2 Meeting#89 R2-150238, Athens, Greece, Feb. 9-13, 2015, Agenda Item: 7.2, Source: Fujitsu, Title: Discussion on the PUCCH support on SCell.
3GPP TSG-RAN WG4 Meeting #68, Barcelona, Spain, Aug. 19-23, 2013, R4-134045, Agenda item: 5.2.3, Source: NSN, Nokia Corporation, Title: Remaining issues on SCell Activation Delay Requirements.
3GPP TSG-RAN1#63bis meeting R1-110069, Dublin, Ireland, Jan. 17-21, 2011, Agenda Item: 6.2.1, Source: Samsung, Title: CSI reporting and SRS timing upon SCell activation/deactivation.
3GPP TSG-RAN1#64 meeting R1-110721, Taipei, Taiwan, Feb. 21-25, 2011, Agenda item: 4, Source: Samsung, Title: CQI reporting at SCell activation.
3GPP TSG-RAN WG2 Meeting #89 R2-150380, Athens, Greece, Feb. 9-Feb. 13, 2015, Source: LG Electronics Inc., Title: Potential issues in MAC for CA enhancement.
3GPP TSG-RAN WG2 Meeting #89 R2-150263, Athens, Greece, Feb. 9-13, 2015, Source: CATT, Title: Introduction of PUCCH Cell Group.
3GPP TSG RAN WG1 #80 R1-150358, Athens, Greece, Feb. 9-13, 2015, Agenda item: 7.2.2.2.1, Source: Samsung, Title: Necessary mechanisms for supporting CA with up to 32 CCs.
3GPP TSG RAN WG1 #80 R1-150359, Athens, Greece, Feb. 9-13, 2015, Agenda item: 7.2.2.2.2, Source: Samsung, Title: Enhancements to DL control signaling for CA with up to 32 CCs.
3GPP TSG RAN WG1 Meeting #80 R1-150104, Athens, Greece, Feb. 9-13, 2015, Source: CATT, Title: Enhancements to DL control signaling for Rel-13 CA.
3GPP TSG RAN WG1 Meeting #80 R1-150137, Athens, Greece, Feb. 9-13, 2015, Source: ZTE, Title: PDCCH/EPDCCH enhancements for Carrier Aggregation.
3GPP TSG RAN WG1 Meeting #80 R1-150169, Athens, Greece, Feb. 9-13, 2015, Agenda item: 7.2.2.2.2, Source: Alcatel-Lucent Shanghai Bell, Alcatel-Lucent, Title: Enhancements to DL control signalling for up to 32 component carriers.

3GPP TSG RAN WG1 Meeting #80 R1-150170, Athens, Greece, Feb. 9-13, 2015, Source: Alcatel-Lucent Shanghai Bell, Alcatel-Lucent, Title: DL PHICH enhancement to support up to 32 carriers aggregation.
3GPP TSG RAN WG1 Meeting #80 R1-150277, Athens, Greece, Feb. 9-13, 2015, Source: Sharp, Title: Considerations on DL Control Signaling for Rel-13 CA.
3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.
3GPP TSG RAN WG1 Meeting #80 R1-150293, Athens, Greece, Feb. 9-13, 2015, Agenda item: 7.2.2.2.2, Source: NEC, Title: Discussion on DL control signaling enhancements.
3GPP TSG RAN WG1 Meeting #80 R1-150315, Athens, Greece, Feb. 9-13, 2015, Source: Panasonic, Title identified DL aspects for CA beyond 5 carriers.
3GPP TSG RAN WG1 Meeting #80 R1-150437, Athens, Greece, Feb. 9-13, 2015, Source: CMCC, Title: Design principle to support CA up to 32 carriers.
3GPP TSG RAN WG1 Meeting #80 R1-150523, Athens, Greece, Feb. 9-13, 2015, Agenda item: 7.2.2.2.2, Source: HTC, Title: DL control signaling for CA up to 32 CCs.
3GPP TSG RAN WG1 Meeting #80 R1-150593, Athens, Greece, Feb. 9-13, 2015, Source: NTT Docomo, Inc., Title: Necessary enhancements to enable LTE CA of up to 32CCs for DL and UL.
3GPP TSG RAN WG1 Meeting #80 R1-150824, Athens, Feb. 9-13, 2015, Title: Observations on Necessary Enhancements to DL control signaling, Source: Nokia Corporation, Nokio Networks, NTT Docomo.
3GPP TSG-RAN WG2 Meeting #89 R2-150038, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.
3GPP TSG-RAN WG1 Meeting #80 R1-150495, Athens, Greece, Feb. 9-13, 2015, Agenda item: 7.2.2.2.2, Source: Nokia Corporation, Nokia Networks, Title: On DL control signalling for up to 32 component carriers.
3GPP TSG-RAN WG1#80 R1-150323, Athens, Greece, Feb. 9-13, 2015, Source: Ericsson, Title: DL control signaling enhancements for up to 32 CCs.
3GPP TSG-RAN WG2 meeting #89 R2-150149, Athens, Greece, Feb. 9-13, 2015, Source: ZTE, Title: The principle of grouping PUCCH cell.
3GPP TSG-RAN2 #89 Meeting R2-150289, Athens, Greece, Feb. 9-13, 2015, Source: MediaTek Inc., Title: Cross-carrier scheduling for CA enhancement beyond 5CCs.
3GPP TSG-RAN2 #89 Meeting R2-150290, Athens, Greece, Feb. 9-13, 2015, Source: MediaTek Inc., Title: PUCCH on SCell for CA enhancement beyond 5CCs.
3GPP TSG RAN WG1 #80 R1-150357, Athens, Greece, Feb. 9-13, 2015, Agenda item: 7.2.2.1, Source: Samsung, Title: PUCCH Transmission on SCell for CA.
3GPP TSG RAN WG1 #80 R1-150361, Athens, Greece, Feb. 9-13, 2015, Agenda item: 7.2.2.2.3, Source: Samsung, Title: CSI Transmission for Enhanced CA.
3GPP TSG RAN WG1 #80 R1-150468, Feb. 9-Feb. 13, 2015, Athens, Greece, Agenda item: 7.2.2.1, Source: Qualcomm Incorporated, Title: PUCCH on SCell.
3GPP TSG RAN WG1 #80 R1-150473, Feb. 9-Feb. 13, 2015, Athens, Greece, Agenda item: 7.2.2.2.3, Source: Qualcomm Incorporated, Title: CSI feedback for up to 32 component carriers.
3GPP TSG RAN WG1 #80 R1-150742, Feb. 9-Feb. 13, 2015, Athens, Greece, Agenda item: 7.2.2.2.3, Source: Qualcomm Incorporated, Title: HARQ ACK for up to 32 DL Carriers.
3GPP TSG RAN WG1 #80 R1-150823, Athens, Greece, Feb. 9-13, 2015, Title: WF on PUCCH on SCell for CA, Source: NTT Docomo, NEC, Sharp, Softbank Mobile, Intel, Ericsson, KDDI.
3GPP TSG RAN WG1 #80, Athens, Greece, Feb. 9-13, 2015, R1-150822, Title: Way Forward on PUCCH on SCell for CA, Source: Ericsson, NEC, Sharp, NTT Docomo, ZTE.
3GPP TSG RAN WG1 #80, Athens, Greece, Feb. 9-13, 2015, R1-150926, Title: WF on target scenarios for UCI feedback design, Source: Ericsson, CATT.

(56) References Cited

OTHER PUBLICATIONS

3GPP TSG RAN WG1 Meeting #80 R1-150101, Athens, Greece, Feb. 9-13, 2015, Source: CATT, Title: PUCCH on SCell for Rel-13 CA.
3GPP TSG RAN WG1 Meeting #80 R1-150103, Athens, Greece, Feb. 9-13, 2015, Source: CATT, Title: Enhancements to support carrier aggregation with up to 32 component carriers.
3GPP TSG RAN WG1 Meeting #80 R1-150106, Athens, Greece, Feb. 9-13, 2015, Source: CATT, Title: Periodic CSI feedback for Rel-13 CA.
U.S. Pat. No. 9,820,264, Data and Multicast Signals in a Wireless Device and Wireless Network, Feb. 27, 2016.
U.S. Pat. No. 9,820,298, Scheduling Request in a Wireless Device and Wireless Network, Mar. 2, 2016.
U.S. Pat. No. 9,872,336, Secondary Cell and Control Channel in a Wireless Device and Wireless Network, Feb. 26, 2016.
U.S. Pat. No. 9,877,334, Cell Configuration in a Wireless Device and Wireless Network, Apr. 5, 2016.
U.S. Pat. No. 9,894,681, Uplink Scheduling in a Wireless Device and Wireless Network, May 20, 2016.
U.S. Pat. No. 9,929,848, Secondary Cell Deactivation in Carrier Aggregation, Feb. 28, 2016.
U.S. Pat. No. 9,948,487, Uplink Resource Allocation in a Wireless Network, May 24, 2016.
U.S. Pat. No. 10,165,592, Scheduling Request Resource Selection, Mar. 3, 2016.
U.S. Pat. No. 10,182,406, Power Headroom Report for a Wireless Device and a Base Station, Mar. 2, 2016.
U.S. Pat. No. 10,200,177, Scheduling Request on a Secondary Cell of a Wireless Device, May 19, 2016.
U.S. Appl. No. 15/091,289, Uplink Control Information Transmission in a Wireless Network, filed Apr. 5, 2016.
U.S. Appl. No. 15/809,521, Data and Multicast Signals in a Wireless Device and Wireless Network, filed Nov. 10, 2017.
U.S. Appl. No. 15/809,619, Scheduling Request in a Wireless Device and Wireless Network, filed Nov. 10, 2017.
U.S. Appl. No. 15/863,263, Secondary Cell and Control Channel in a Wireless Device and Wireless Network, filed Jan. 5, 2018.
U.S. Appl. No. 15/867,610, Cell Configuration in a Wireless Device and Wireless Network, filed Jan. 10, 2018.
U.S. Appl. No. 15/889,650, Scheduling Resource Allocation in Wireless Network, filed Feb. 6, 2018.
U.S. Appl. No. 15/927,283, Secondary Cell Deactivation in a Wireless Device and a Base Station, filed Mar. 21, 2018.
U.S. Appl. No. 15/951,499, Wireless Uplink Resource Allocation, filed Apr. 12, 2018.
U.S. Appl. No. 16/179,462, Scheduling Request on a Secondary Cell of a Wireless Device, filed Nov. 2, 2018.
U.S. Appl. No. 16/231,877, Scheduling Request Resource Selection, filed Dec. 24, 2018.
U.S. Appl. No. 16/245,921, Power Headroom Report for a Wireless Device and a Base Station, Jan. 11, 2019.
Jun. 5, 2019—Chinese Second Office Action—CN 201680014414.7.
Jul. 9, 2018—Chinese Office Action—CN 201680014760.5.
Sep. 5, 2018—Chinese Office Action—CN 201680014404.7.
Sep. 18, 2018—Japanese Office Action—JP 2017-546998.
Nov. 23, 2018~Korean Notice of Allowance—KR 20177025339.
Feb. 22, 2019—Chinese Office Action—CN 201680014760.5.
3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and Channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN WG2 #89 bis R2-151304, Apr. 20 to May 24, 2015, Bratislava, Slovakia, Source: ITRI, Title: Discussion on SR on PUCCH SCell.
3GPP TSG RAN WG2 #89bis R2-151637, Apr. 20 to 24, 2015, Bratislava, Slovakia, Source: Samsung, Title: SR support for CA enhancements.
3GPP TSG RAN WG2 #90 R2-152712, May 25 to 29, 2015, Fukuoka, Japan, Source: Samsung, Title: How to support SR in PUCCH SCell.
3GPP TSG RAN WG2 Meeting #89b R2-151430, Bratislava, Slovakia, Apr. 20-24, 2015, Source: NEC, Title: SR on PUCCH SCell.
3GPP TSG RAN WG2 Meeting #89bis R2-151104, Bratislava, Slovakia, Apr. 20-24, 2015, Source: Intel Corporation, Title: Control plane aspects of support PUCCH on SCell.
3GPP TSG RAN WG2 Meeting #89bis R2-151342, Bratislava, Slovakia, Apr. 20-24, 2015, Source: CATT, Title: D-SR on PUCCH SCell.
3GPP TSG RAN WG2 Meeting #90 R2-152277, Fukuoka, Japan, May 25-29, 2015, Source: CATT, Title: D-SR on PUCCH SCell.
3GPP TSG RAN WG2 Meeting #90 R2-152512, Fukuoka, Japan, May 25-29, 2015, Source: NEC, Title: Potential issues of SR on PUCCH SCell.
3GPP TSG RAN2 Meeting #90 R2-152524, Fukuoka, Japan, May 25-29, 2015, Source: NEC, Title: Overlapping of D-SR resources.
3GPP TSG-RAN WG2 #89bis R2-151495, Bratislava, Slovakia, Apr. 20-24, 2015, Source: HTC, Title: PUCCH SCell management.
3GPP TSG-RAN WG2 #89bis Tdoc R2-151488, Bratislava, Slovakia, Apr. 20-24, 2015, Source: Ericsson, Title: SR on PUCCH SCell.
3GPP TSG-RAN WG2 #90 R2-152418, Fukouka, Japan, May 25-29, 2015, Source: HTC, Title: Managing PUCCH resources on a deactivated PUCCH SCell.
3GPP TSG-RAN WG2 #90 Tdoc R2-152530, Fukuoka, Japan, May 25-29, 2015, Source: Ericsson, Title: SR on PUCCH SCell.
3GPP TSG-RAN WG2 Meeting #89bis R2-151211, Bratislava, Slovakia, Apr. 20-24, 2015, Source: Nokia Networks, Title: SR on Scell.
3GPP TSG-RAN WG2 Meeting #89bis R2-151324, Bratislava, Slovakia, Apr. 20-24, 2015, Source: Huawei, HiSilicon, Title: Leftover issues for PUCCH on SCell.
3GPP TSG-RAN WG2 Meeting #89bis R2-151469, Bratislava, Slovakia, Apr. 20-24, 2015, Source: Alcatel-Lucent Shanghai Bell, Alcatel-Lucent, Title: SR transmissions on SCell PUCCH.
3GPP TSG-RAN WG2 Meeting #90 R2-152273, Fukuoka, Japan, May 25-29, 2015, Source: Huawei, HiSilicon, Title: Issues for SR on PUCCH SCell.
3GPP TSG-RAN WG2 Meeting #90 R2-152302, Fukuoka, Japan, May 25-29, 2015, Source: Nokia Networks, Title: SR on PUCCH SCell
3GPP TSG-RAN WG2 Meeting #90 R2-152310, Fukuoka, Japan, May 25-29, 2015, Source: Nokia Networks, Title: PUCCH SCell pre-activation.

(56) References Cited

OTHER PUBLICATIONS

3GPP TSG-RAN WG2 Meeting #90 R2-152366, Fukuoka, Japan, May 25-May 29, 2015, Source: LG Electronics Inc., Title: SR for CA enhancement.
3GPP TSG-RAN WG2 Meeting #90 R2-152513, Fukuoka, Japan, May 25-29, 2015, Title: SR on PUCCH-SCell, Source.
3GPP TSG-RAN WG2 Meeting #90 R2-152742, Fukuoka, Japan, May 25-29, 2015, Source: Qualcomm Incorporated, Title: Dual SR Procedures.
3GPP TSG-RAN2 #89bis Meeting R2-151252, Bratislava, Slovakia, Apr. 20-24, 2015, Source: MediaTek Inc., Title: Remaining issues for PUCCH on SCell.
3GPP TSG-RAN2 #90 Meeting R2-152138, Fukuoka, Japan, May 25-29, 2015, Source: MediaTek Inc., Title: Remaining UP issues for PUCCH on SCell.
Samsung, "Text Proposal for PHR in dual connectivity", May 19-23, 2014, pp. 1-7, 3GPP TSG RAN WG2 #86, R2-142275, Seoul, Korea.
Japanese Office Action dated Jan. 30, 2018 in Japanese Patent Application No. 2017-546998.
R2-140066, 3GPP TSG RAN WG2 Meeting #85, Prague, Czech Republic, Feb. 10-14, 2014, Title: Consideration on PHR for TDD eiMTA.
3GPP TSG RAN meeting #67, Shanghai, China, Mar. 9-12, 2015, RP-150272, Status Report to TSG, Agenda item: 11.3.4, Title: LTE Carrier Aggregation Enhancement Beyond 5 Carriers.
3GPP TSG RAN WG1 Meeting #80 R1-150102, Athens, Greece, Feb. 9-13, 2015, Source: CATT, Title: Uplink power control to support PUCCH on SCell for Rel-13 CA.
3GPP TSG RAN WG1 Meeting #80bis R1-15xxxx, Belgrade, Serbia, Apr. 20-24, 2015, Source: MCC Support, Title: Draft Report of 3GPP TSG RAN WGI #80 v0.2.0, Athens, Greece, Feb. 9-13, 2015.
3GPP TSG RAN WG2 Meeting #89 R2-150169, Athens, Greece, Feb. 9-13, 2015, Source: Intel Corporation, Title: Considerations for PUCCH on SCell in carrier aggregation.
3GPP TSG-RAN WG1 #80 R1-150085, Athens, Greece, Feb. 9-13, 2015, Source: Intel Corporation, Title: Support of PUCCH on SCell for CA.
3GPP TSG-RAN WG1#80 R1-150321, Athens, Greece, Feb. 9-13, 2015, Source: Ericsson, Title: PUCCH on SCell or carrier aggregation.
3GPP TSG-RAN WG2 #89 R2-150112, Feb. 9-13, 2015, Athens, Greece, Source: NTT Docomo, Inc., Title: Discussion on PUCCH on SCell.
3GPP TSG-RAN WG2 #89 TDOC R2-150389, Athens, Greece, Feb. 9-13, 2015, Source: Ericsson, Title: PUCCH on SCell.
3GPP TSG-RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.
3GPP TSG-RAN WG2 Meeting #89 R2-150527, Athens, Greece, Feb. 9-13, 2015, Source: Qualcomm Incorporated, Title: General principles for the support of PUCCH on SCell.
3GPP TSG-RAN WG2 Meeting #89 R2-150151, Athens, Greece, Feb. 9-13, 2015, Source: ZTE, Title: Discussion on the impact for the support of PUCCH on SCell, Agenda item: 7.2.
3GPP TSG-RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.
3GPP TSG-RAN WG2 Meeting #89 R2-150410, Athens, Greece, Feb. 9-13, 2015, Agenda item: 7.2, Source: Nokia Corporation, Nokia Networks, Title: PHR for SCell with PUCCH, WID/SID: LTE_CA_enh_b5G-Core-Release 13.
3GPP TSG-RAN WG2 Meeting #89 R2-150372, Athens, Greece, Feb. 9-13, 2015, Source: Huawei, HiSilicon, Title: Introduce PUCCH on SCell for CA beyond 5 carriers.
3GPP TSG RAN WG1 Meeting #81 R1-153295, Fukuoka, Japan, May 25-29, 2015, Source: Institute for Information Industry (III), Title: Discussion on Dynamic Selection of SR PUCCH Resources.

3GPP TSG RAN WG2 Meeting #89 R2-150264, Athens, Greece, Feb. 9-13, 2015, Source: CATT, Title: Discussion on the functionality of PUCCH SCell.
3GPP TSG RAN WG2 Meeting RAN2#89, Athens, Greece, Feb. 9-13, 2015, R2-150403, Agenda Item: 7.2, Source: NEC, Title: PUCCH on SCell.
3GPP TSG RAN WG1 Meeting #80 R1-150168, Athens, Greece, Feb. 9-13, 2015, Source: Alcatel-Lucent Shanghai Bell, Alcatel-Lucent, Title: CA enhancement to support up to 32 carrier aggregation.
3GPP TSG RAN WG1 Meeting #80 R1-150171, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.
3GPP TSG RAN WG1 Meeting #80 R1-150276, Athens, Greece, Feb. 9-13, 2015, Source: Sharp, Title: Considerations on PUCCH for Rel-13 CA.
3GPP TSG RAN WG1 Meeting #80 R1-150294, Athens, Greece, Feb. 9-13, 2015, Agenda item: 7.2.2.2.3, Source: NEC, Title: Discussion on UL control signaling enhancements.
3GPP TSG RAN WG1 Meeting #80 R1-150390, Athens, Greece, Feb. 9-13, 2015, Agenda Item: 7.2.2.2.1, Source: Huawei, HiSilicon, Title: On CA enhancements supporting up to 32 component .carriers.
3GPP TSG RAN WG1 Meeting #80 R1-150412, Athens, Greece, Feb. 9-13, 2015, Agenda Item: 7.2.2.2.3, Source: Huawei, HiSilicon, Title: CSI feedback enhancement for carrier aggregation enhancement beyond 5 carriers.
3GPP TSG RAN WG1 Meeting #80 R1-150489, Athens, Greece, Nov. 17-21, 2014, Source: ITL Inc., Title: Uplink control signaling enhancements for b5C CA.
3GPP TSG RAN WG1 Meeting #80 R1-150509, Athens, Greece, Feb. 9-13, 2015, Source: NTT Docomo, NC., Title: PUCCH on SCell for UEs supporting UL-CA.
3GPP TSG RAN WG1 Meeting #80 R1-150510, Athens, Greece, Feb. 9-13, 2015, Source: NTT Docomo, NC., Title: Initial views on CA enhancements to support up to 32 component carriers.
3GPP TSG RAN WG1 Meeting #80 R1-150699, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150825, Athens, Feb. 9-13, 2015, Title: Observations on Necessary Enhancements to UL control signaling, Source: Nokia Networks, Nokia Corporation, NTT Docomo.
3GPP TSG-RAN WG1 #80 R1-150086, Athens, Greece, Feb. 9-13, 2015, Source: Intel Corporation, Title: Discussion on CA enhancement for release 13.
3GPP TSG-RAN WG1 #80 R1-150537, Athens, Greece, Feb. 9-13, 2015, Agenda Item: 7.2.2.2.1, Source: InterDigital Communications, Title: Enabling LTE carrier aggregation of up to 32 component carriers.
3GPP TSG-RAN WG1 Meeting #80 R1-150454, Athens, Greece, Feb. 9-13, 2015, Agenda item: 7.2.2.2.3, Source: Nokia Networks, Nokia Corporation, Title: PUCCH Enhancements for Carrier Aggregation Enhancement Beyond 5 Carriers.
3GPP TSG-RAN WG1 Meeting #80 R1-150455, Athens, Greece, Feb. 9-13, 2015, Agenda item: 7.2.2.2.3, Source: Nokia Networks, Nokia Corporation, Title: CSI reporting for Carrier Aggregation Enhancement Beyond 5 Carriers.
3GPP TSG-RAN WG1#80 R1-150324, Athens, Greece, Feb. 9-13, 2015, Source: Ericsson, Title: UL control signaling enhancements for up to 32 CCs.
3GPP TSG-RAN WG2 Meeting#89 R2-150134, Feb. 9-13, 2015, Athens, Greece, Source: Institute for Information Industry (111), Title: Partition UGI feedback.
3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.

(56) References Cited

OTHER PUBLICATIONS

3GPP TSG RAN WG1 Meeting #80 R1-150135, Athens, Greece, Feb. 9-13, 2015, Source: ZTE, Title: Further CA enhancement to support PUCCH on SCell.
3GPP TS 36.211 V13.3.0 (Sep. 2016), Technical Specification 3rd Generation Partnership Project; Technical Specification Group Radio Access Network; Evolved Universal Terrestrial Radio Access (E-UTRA); Physical channels and modulation (Release 13).
3GPP TS 36.212 V13.3.0 (Sep. 2016), Technical Specification, 3rd Generation Partnership Project; Technical Specification Group Radio Access Network; Evolved Universal Terrestrial Radio Access (E-UTRA); Multiplexing and channel coding (Release 13).
3GPP TS 36.213 V13.3.0 (Sep. 2016), Technical Specification, 3rd Generation Partnership Project; Technical Specification Group Radio Access Network; Evolved Universal Terrestrial Radio Access (E-UTRA); Physical layer procedures (Release 13).
3GPP TS 36.300 V13.5.0 (Sep. 2016), Technical Specification, 3rd Generation Partnership Project; Technical Specification Group Radio Access Network; Evolved Universal Terrestrial Radio Access (E-UTRA), and Evolved Universal Terrestrial Radio Access Network (E-UTRAN); Overall description; Stage 2 (Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 13).
R1-160561, GPP TSG RAN WG1 Meeting #84, St Julian's, Malta, Feb. 15-19, 2016, Agenda item: 7.3.1.1, Source: Samsung, Title: Discussion on UL power control for UL LAA.
IEEE 802 Interim Session, Atlanta, USA, Jan. 11-16, 2015, Title: 3GPP & unlicensed spectrum.
R1-152739, 3GPP TSG RAN WG1 meeting #81, Fukuoka, Japan, May 25-29, 2015, Agenda Item: 6.2.4.3, Source: LG Electronics, Title: UL power control in LAA.
R1-155472, 3GPP TSG RAN WG1 #82bis, Malmo, Sweden, Oct. 5-9, 2015, Agenda item: 7.2.3.3, Source: Samsung, Title: Impact of LAA dynamic power control.
R1-160886, 3GPP TSG RAN WG1 #84, Feb. 15-19, 2016, St. Julian's, Malta, Agenda item: 7.3.1.1, Source: Qualcomm Incorporated, Title: PUSCH power control.
R1-162476, 3GPP TSG RAN WG1 meeting #84bis, Busan, Korea, Apr. 11-15, 2016, Agenda Item: 7.3.1.6, Source: LG Electronics, Title: Power control in LAA uplink.
R1-162662, 3GPP TSG RAN WG1 Meeting #84bis, Busan, Korea Apr. 11-15, 2016, Agenda Item: 7.3.1.1 Source: Samsung, Title: Discussion on UL power control for UL LAA.

R1-163023, 3GPP TSG RAN WG1 #84bis, Apr. 11-15, 2016, Busan, Korea, Agenda item: 7.3.1.1, Source: Qualcomm Incorporated, Title: PUSCH power control.
R1-163762, 3GPP TSG RAN WG1 #84bis, Busan, Korea, Apr. 11-15, 2016, Agenda item: 7.3.1.6, WF on uplink power control in LAA.
R1-164918, 3GPP TSG-RAN WG1 Meeting #85, Nanjing, China, May 23-27, 2016, Agenda item: 6.2.1.1, Source: Nokia, Alcatel-Lucent Shanghai Bell, Title: On PUSCH Transmit Power on LAA SCells.
R1-165557, 3GPP TSG RAN WG1 #85, Nanjing, China, May 23-27, 2016, Agenda item: 6.2.1.1, WF on uplink power control in LAA.
R1-167026, 3GPP TSG-RAN WG1 Meeting #86, Gothenburg, Sweden, Aug. 22-26, 2016, Agenda item: 7.2.1.1, Source: Nokia, Alcatel-Lucent Shanghai Bell, Title: Remaining Issues on LAA SCell PUSCH Transmit Power.
RP-141188, 3GPP TSG RAN Meeting #65, Edinburgh, Scotland, Sep. 9-12, 2014, Source: ZTE, Title: Supporting dual connectivity in LTE-U.
RP-151725, 3GPP TSG RAN Meeting #70, Sitges, Spain, Dec. 7-10, 2015, Source: ZTE, Xinwei Title: Supporting dual connectivity in LAA.
RP-151978, 3GPP TSG RAN Meeting #70, Sitges, Spain, Dec. 7-10, 2015, revision of RP-yynnnn, Source: Ericsson, Huawei, Title: New Work Item on enhanced LAA for LTE.
RP-151979, 3GPP TSG RAN Meeting #70, Sitges, Spain, Dec. 7-10, 2015, Agenda item 14.1.1, Motivation for Enhanced Licensed Assisted Access for LTE in Rel-14.
RP-160926, 3GPP TSG RAN Meeting #72, Busan, Korea, Jun. 13-17, 2016, Source: ZTE, Title: Discussion on further enhancement of LAA for LTE.
RP-161036, 3GPP TSG RAN Meeting #72, Busan, Korea, Mar. 13-16, 2016, Title: Motivation for New Work Item for Enhancing Utilization of CA for LTE, Source: Nokia, Alcatel-Lucent Shanghai Bell, Agenda Item: 10.1.2.
RP-161150, 3GPP TSG RAN Meeting #72, Busan, Korea, Jun. 13-16, 2016, Source: Qualcomm Incorporated Title: New WI proposal on LTE standalone and dual connectivity operation in unlicensed spectrum.
RP-161701, 3GPP TSG RAN Meeting #73, New Orleans, Sep. 19-22, 2016, Source: ZTE, Title: New WI proposal Further enhancement on FeLAA.
RP-161702, 3GPP TSG RAN Meeting #73, New Orleans, USA, Sep. 19-22, 2016, Motivation for New WI Further Enhancement on FeLAA.
Aug. 19, 2016—International Search Report and Written Opinion—PCT/US2016/021201.
Aug. 16, 2016—International Search Report and Written Opinion—PCT/2016/021227.
Feb. 21, 2017—European Office Action—EP16716078.7.
Jun. 18, 2019—Chinese Office Action—201680014760.5.

\* cited by examiner

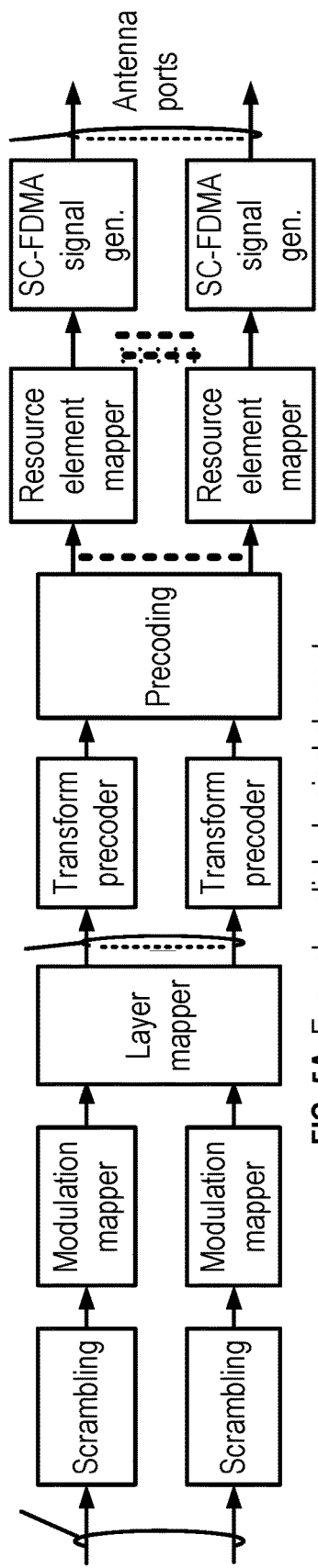
FIG. 5A Example uplink physical channel
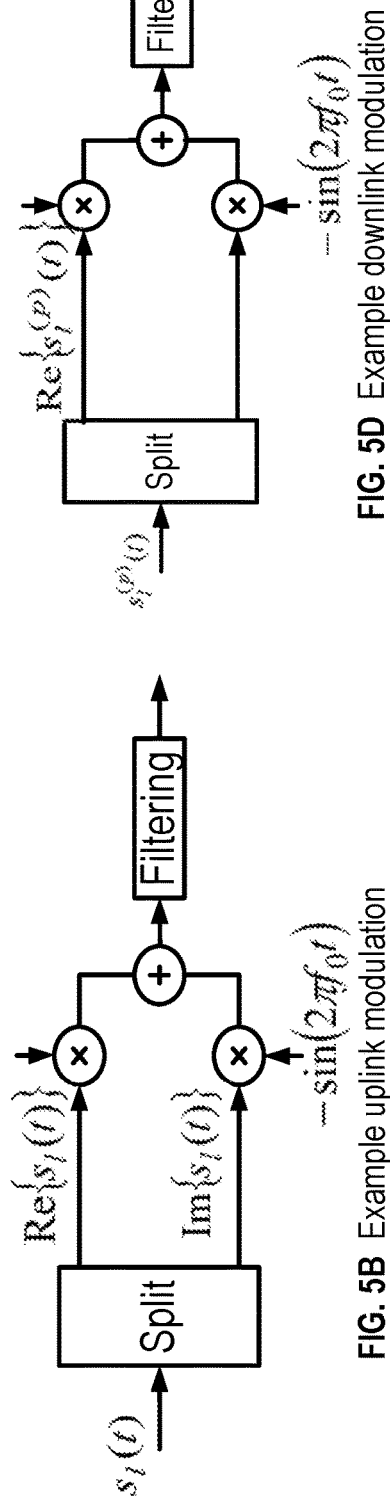
FIG. 5B Example uplink modulation
FIG. 5D Example downlink modulation
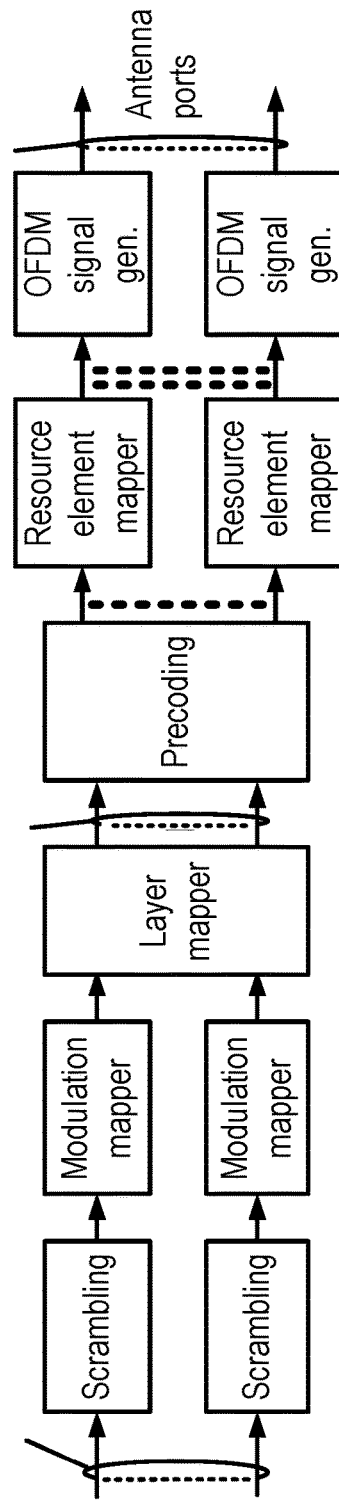
FIG. 5C Example downlink physical channel Dual-Connectivity at eNB FIG. 7  Dual-Connectivity- two MAC entities at UE side Example 1:
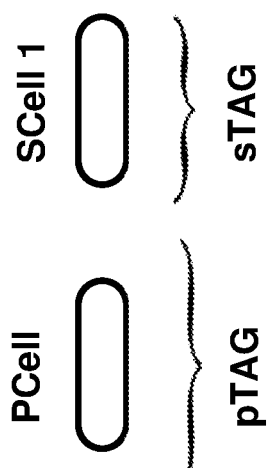
Example 2:
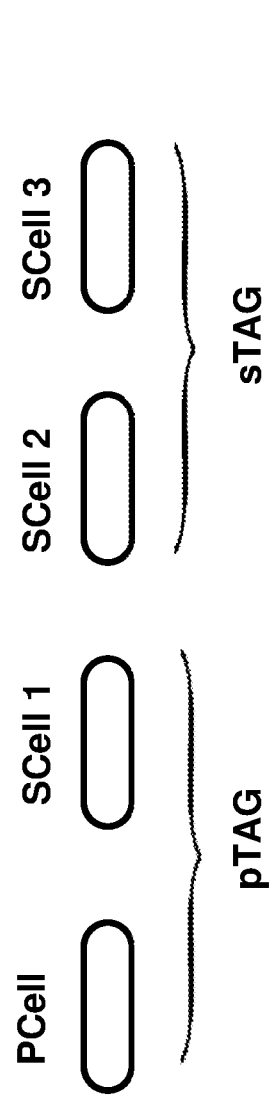
Example 3:
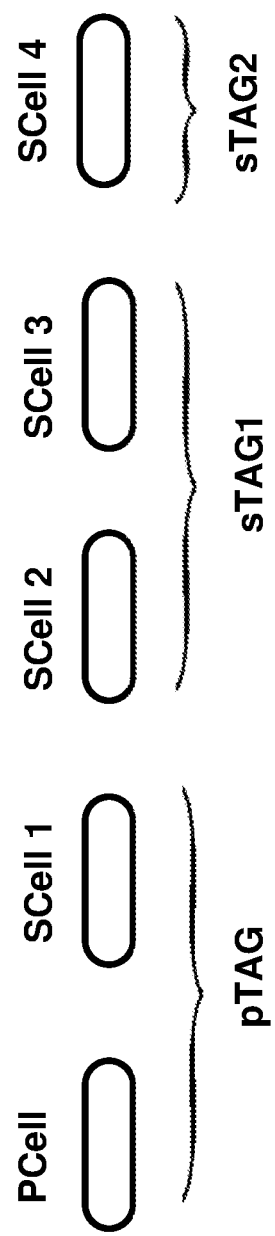
FIG. 8

| SR configuration Index $I_{SR}$ | SR periodicity (ms) $SR_{PERIODICITY}$ | SR subframe offset $N_{OFFSET,SR}$ |
|---|---|---|
| 0 - 4 | 5 | $I_{SR}$ |
| 5 - 14 | 10 | $I_{SR} - 5$ |
| 15 - 34 | 20 | $I_{SR} - 15$ |
| 35 - 74 | 40 | $I_{SR} - 35$ |
| 75 - 154 | 80 | $I_{SR} - 75$ |
| 155 - 156 | 2 | $I_{SR} - 155$ |
| 157 | 1 | $I_{SR} - 157$ |

FIG. 14

SCHEDULING RESOURCE ALLOCATION IN WIRELESS NETWORK

CROSS-REFERENCE TO RELATED APPLICATIONS

This application is a continuation of U.S. patent application Ser. No. 15/889,650, filed Feb. 6, 2018, which is a continuation of U.S. patent application Ser. No. 15/159,920, filed May 20, 2016, which claims the benefit of U.S. Provisional Application No. 62/174,606, filed Jun. 12, 2015. Each of the above-referenced applications are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 14 is an example SR periodicity and subframe offset configuration as per an aspect of an embodiment of the present invention.

DETAILED DESCRIPTION OF EMBODIMENTS

Figure 1:
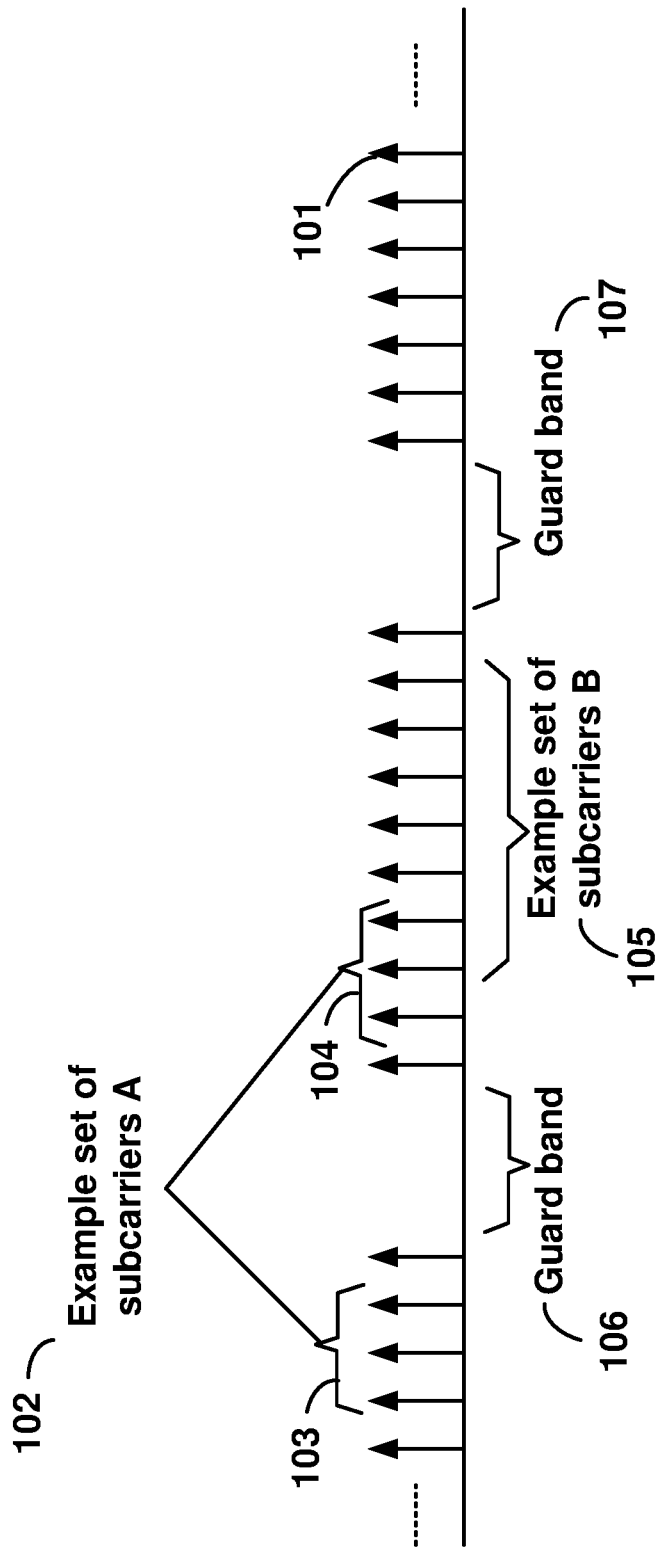
FIG. 1 is a diagram depicting example sets of OFDM subcarriers as per an aspect of an embodiment of the present invention.

Example embodiments of the present invention enable operation of multiple physical uplink control channel (PUCCH) groups. Embodiments of the technology disclosed herein may be employed in the technical field of multicarrier communication systems. More particularly, the embodiments of the technology disclosed herein may relate to operation of PUCCH groups.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
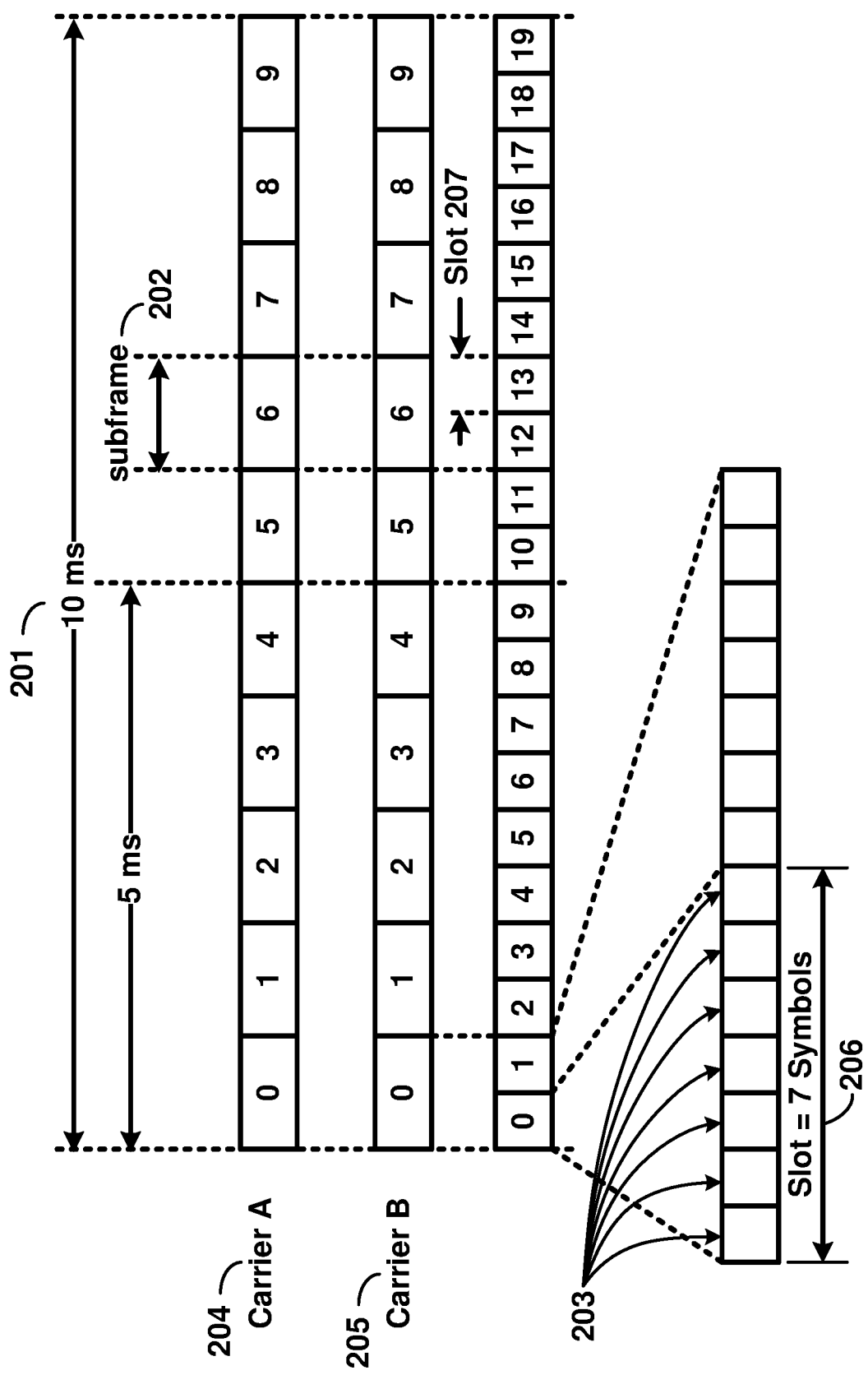
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 msec interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
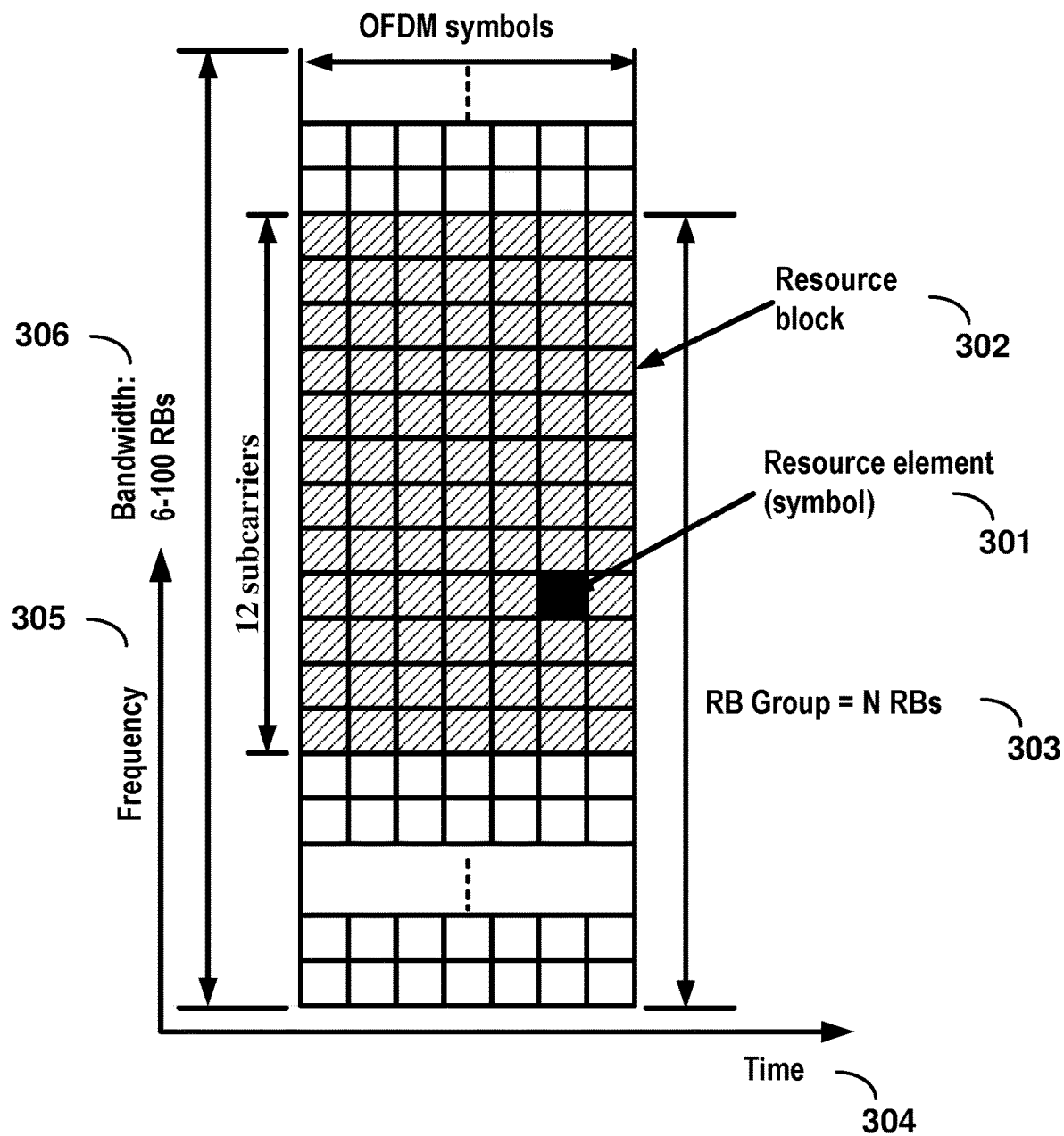
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
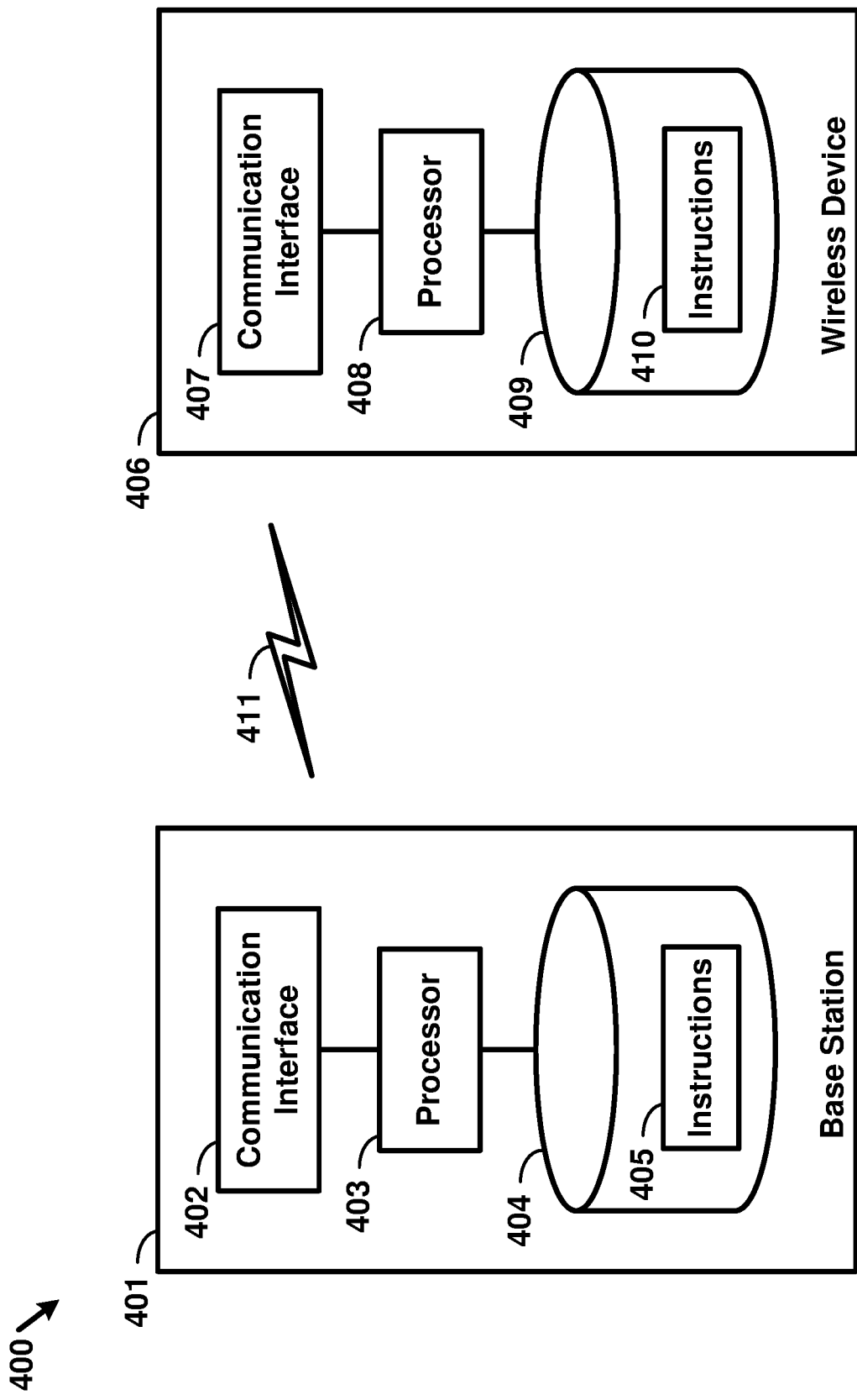
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
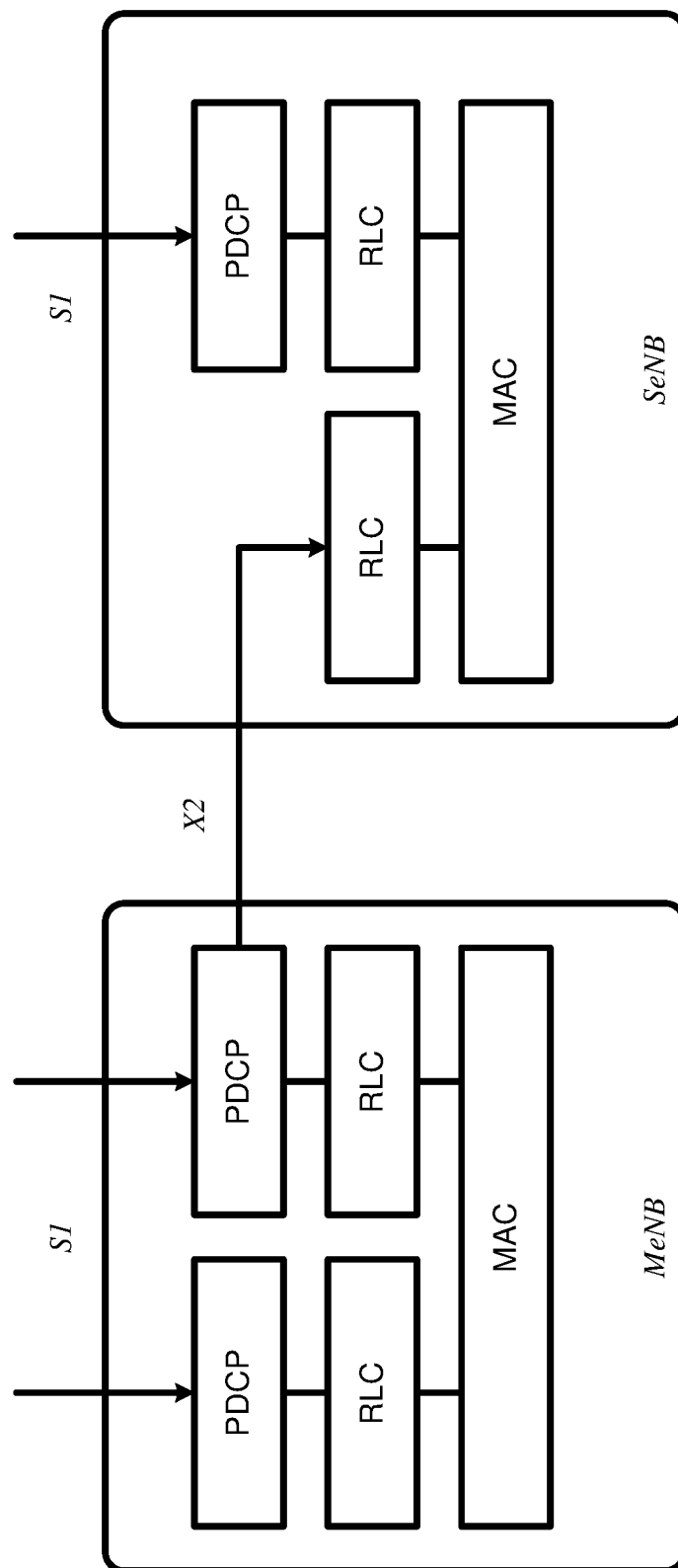
FIG. 6 is an example diagram for a protocol structure with CA and DC as per an aspect of an embodiment of the present invention.
Figure 7:
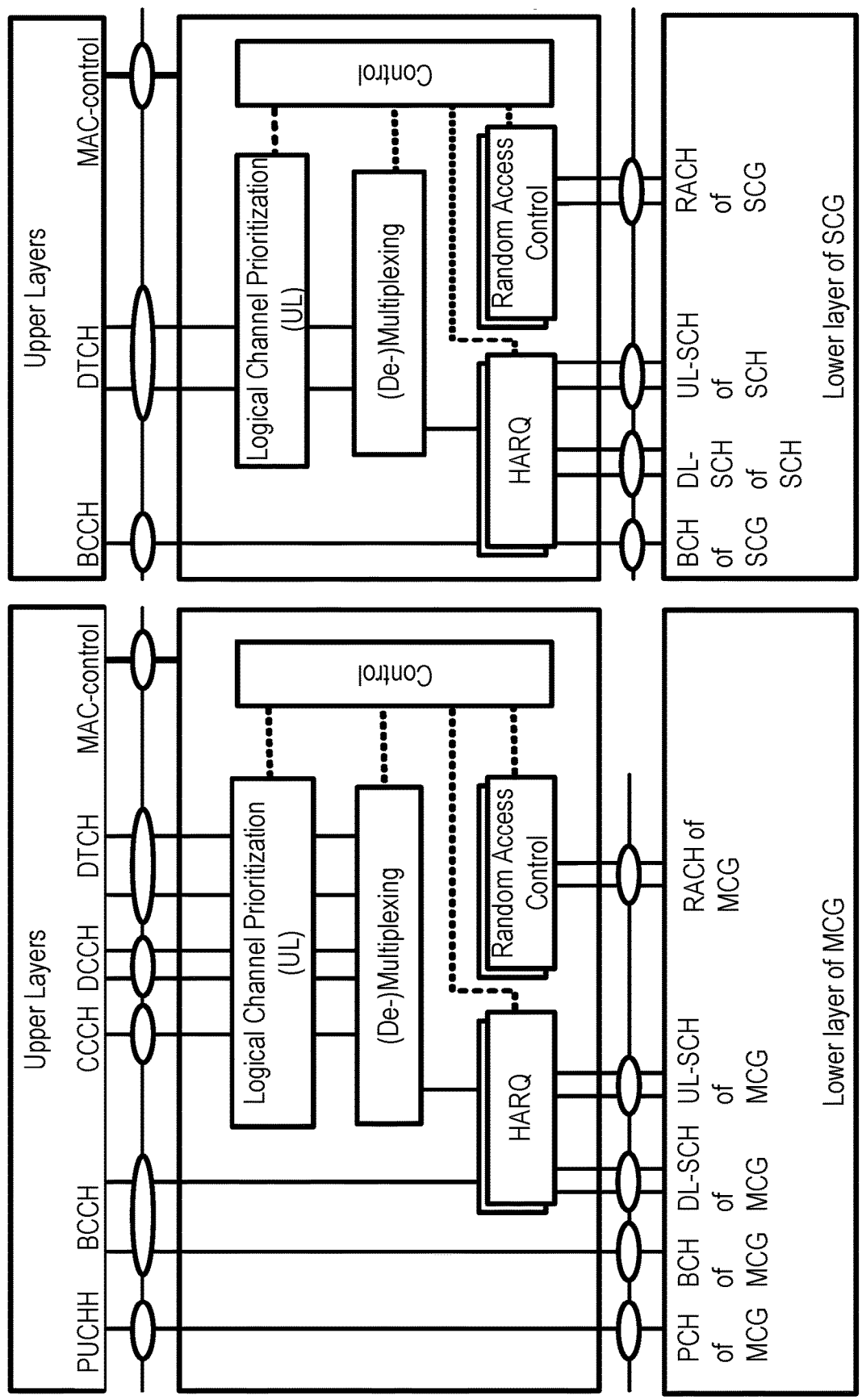
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one-time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
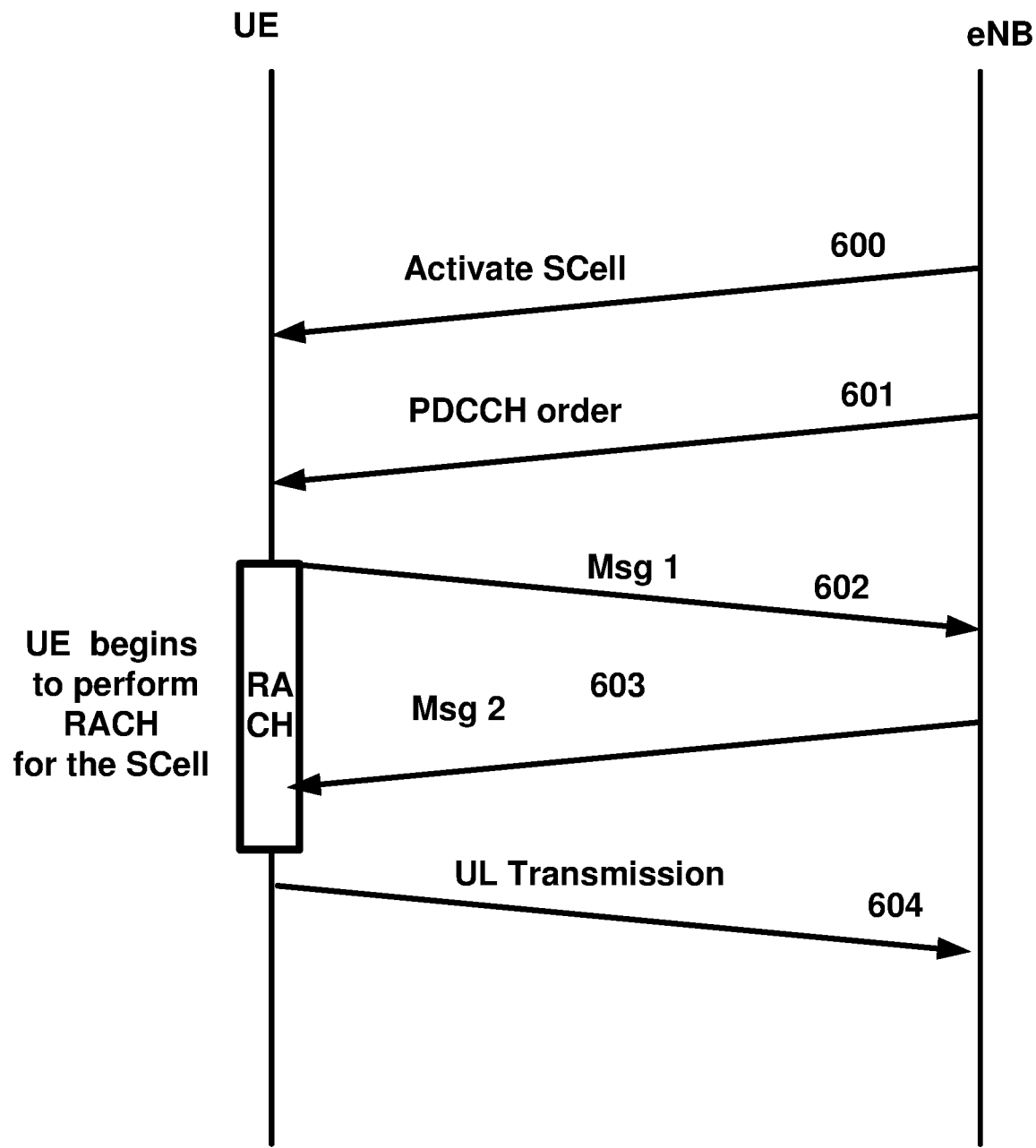
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
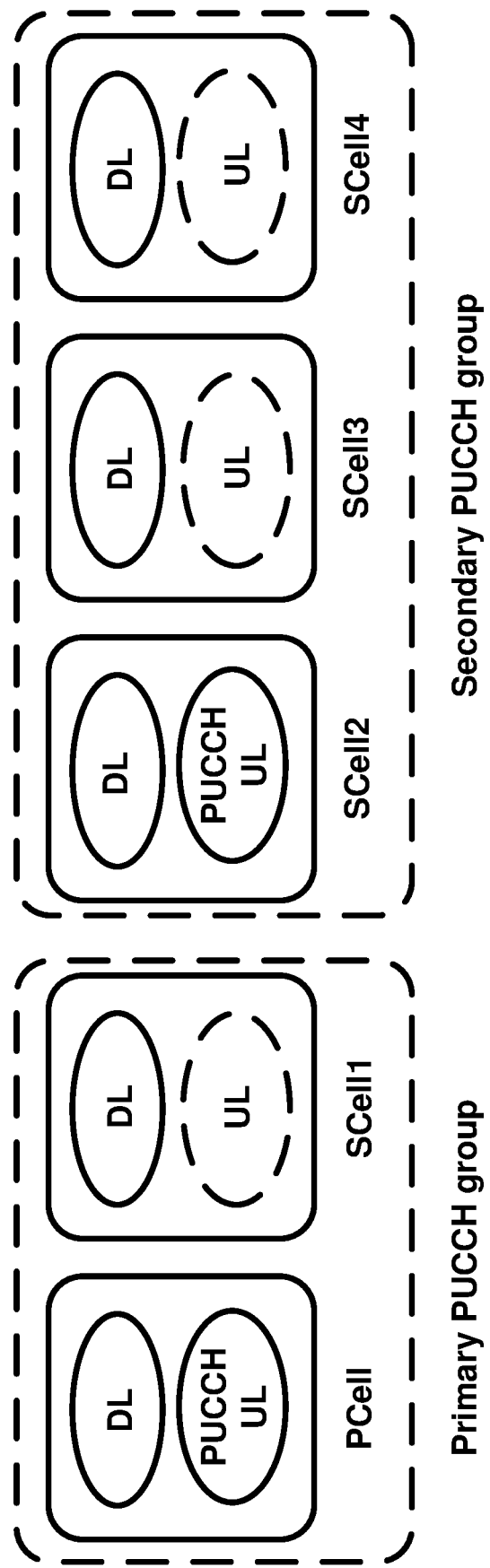
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported.

In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
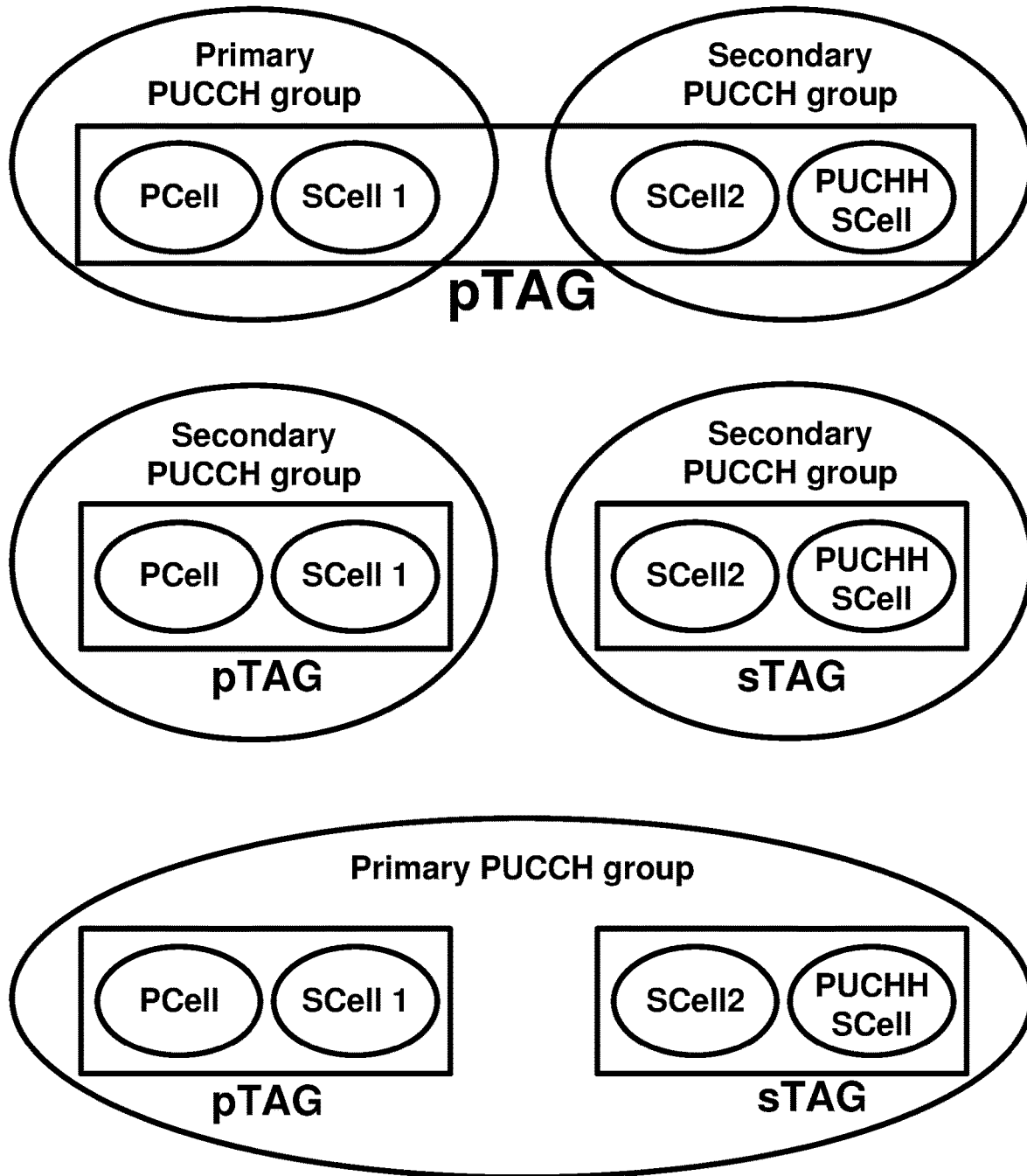
FIG. 11 illustrates example groupings of cells into one or more PUCCH groups and one or more TAGs as per an aspect of an embodiment of the present invention.
Figure 12:
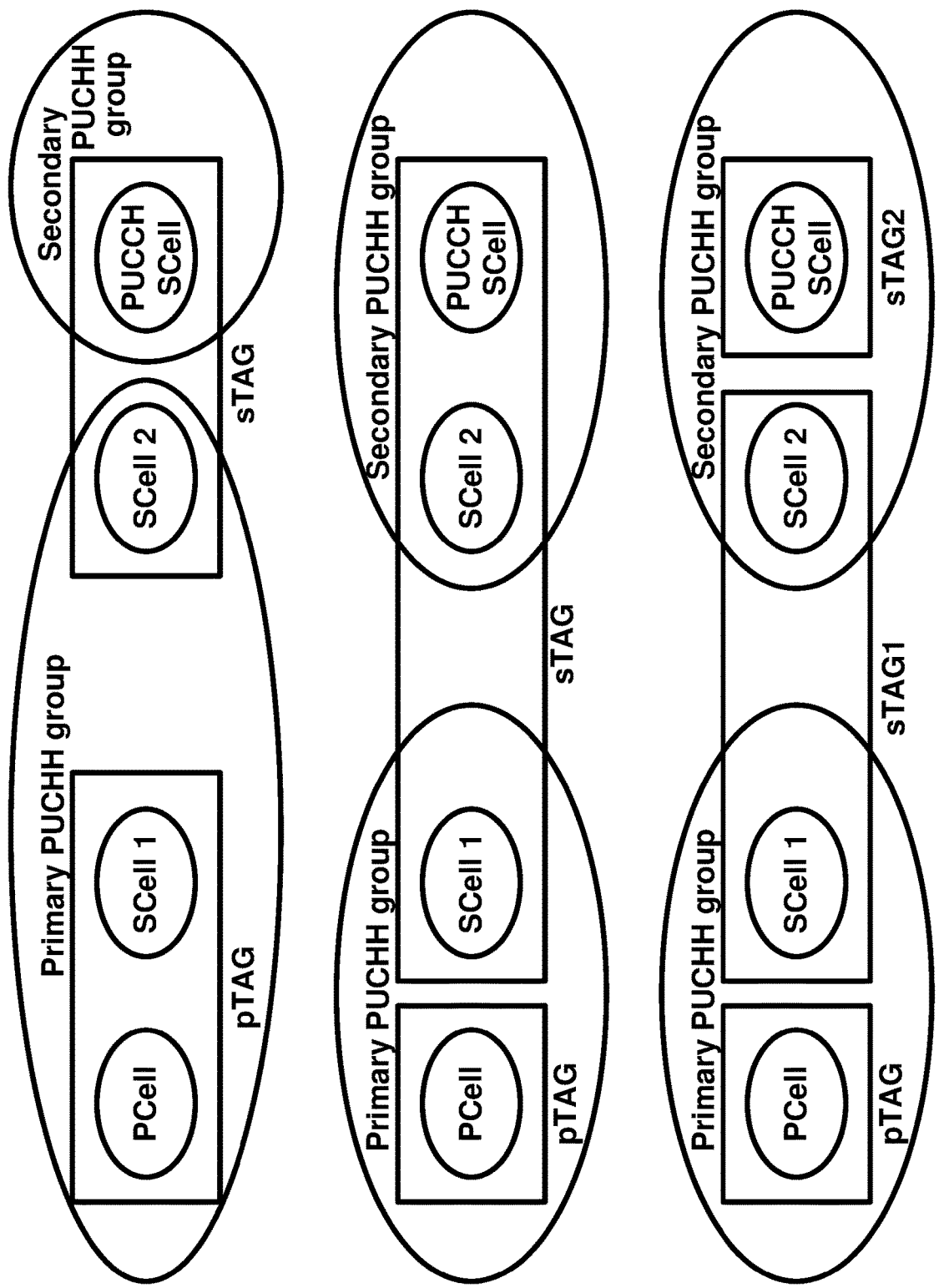
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
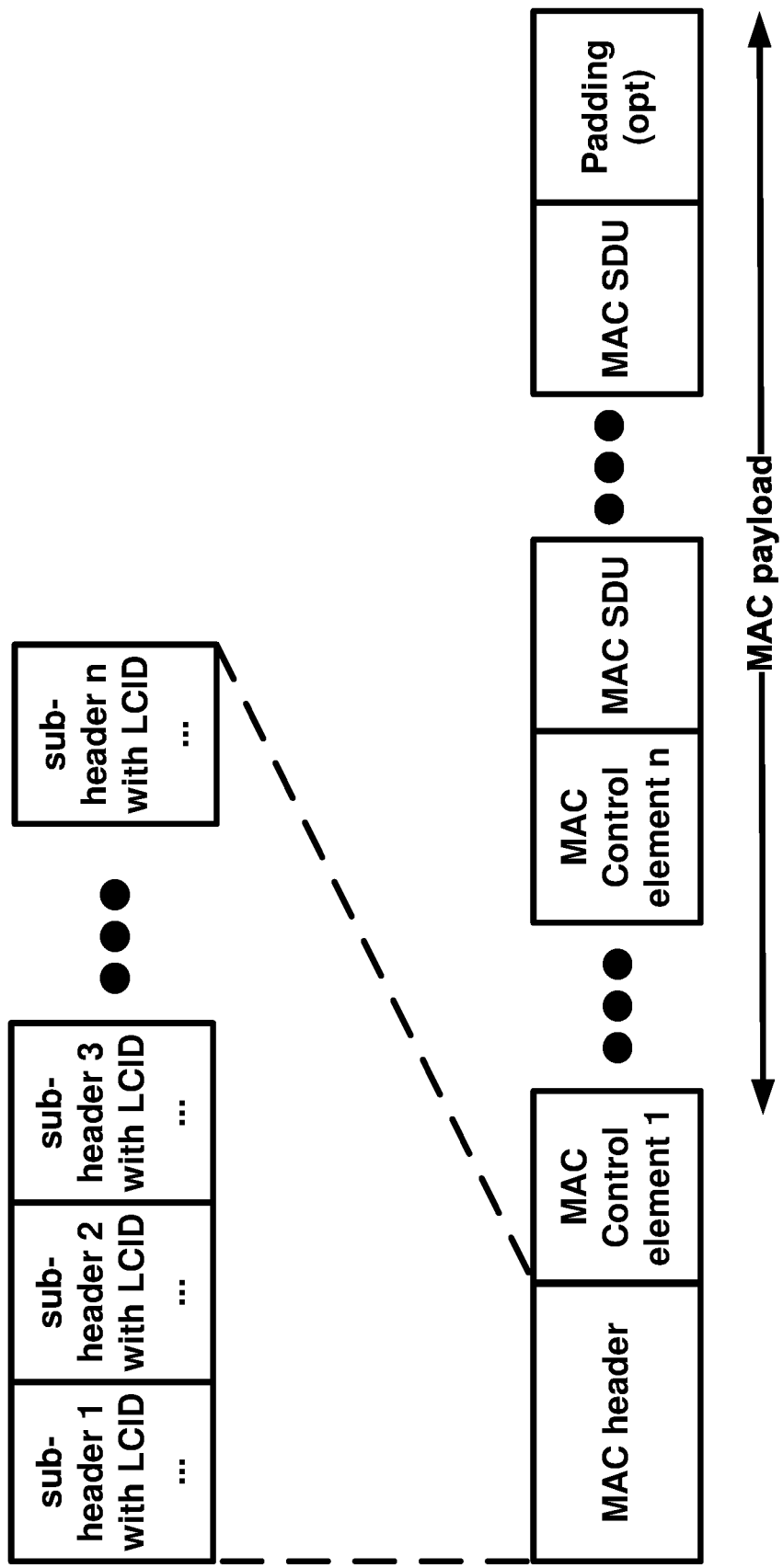
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 . . . 98); nCS-AN: INTEGER (0 . . . 7); and/or n1PUCCH-AN: INTEGER (0 . . . 2047). The parameter deltaPUCCH-Shift ($\Delta_{shift}^{PUCCH}$), nRB-CQI ($N_{RB}^{(2)}$), nCS-An ($N_{CS}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1}, n1PUCCH-AN-Rep: INTEGER (0 . . . 2047)}}, tdd-AckNackFeedbackMode: ENUMERATED {bundling, multiplexing}OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be $n_{PUCCH, ANRep}^{(1, p)}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running A timer can be started if it is not running or restarted if it is running. For example, a timer may be started or restarted from its initial value.

The scheduling request (SR) is used for requesting UL-SCH resources for new transmission(s). In DC, scheduling request (SR) may be directly transmitted from UE to an SeNB via a PSCell. This may reduce scheduling delay and related signaling load.

When PUCCH groups are configured, SR resources may be configured on PCell, PUCCH SCell, or both. The possibility to have SR resources in PUCCH SCell(s) may allow better distribution of SR load among the serving cells. In an example configuration, an SR for a UE may be transmitted on a serving cell, e.g. either on the PCell or on a given PUCCH SCell. In some scenarios, there may be more capacity available on the SCell, and this may be a reason to allocate more SR resources on an PUCCH SCell. If PUCCH on an SCell carries SR signals, the chance of a UE initiated RA on the PCell due to a scheduling request may be reduced and signalling overhead and RACH resource usage may be reduced.

In an example implementation, SR resources may be configured on PUCCH SCell and no SR resources may be configured on PCell. In an example implementation, an SR load may be shared among a PUCCH SCell and a PCell. SR resources may be configured on both PCell and PUCCH SCell. Whether to configure SR resources on PCell, on the PUCCH SCell, or on both PCell and the PUCCH SCell may be up to eNB and/or UE implementation. SR resources may be configured on both PCell and PUCCH SCell. An SR_COUNTER may be increased when SR is sent on either PUCCH SCell or PCell and sr-ProhibitTimer may be implemented to control the timing of SR transmission. An SR process may employ SR resources on both a PCell and a PUCCH SCell, when both resources are configured.

Figure 15:
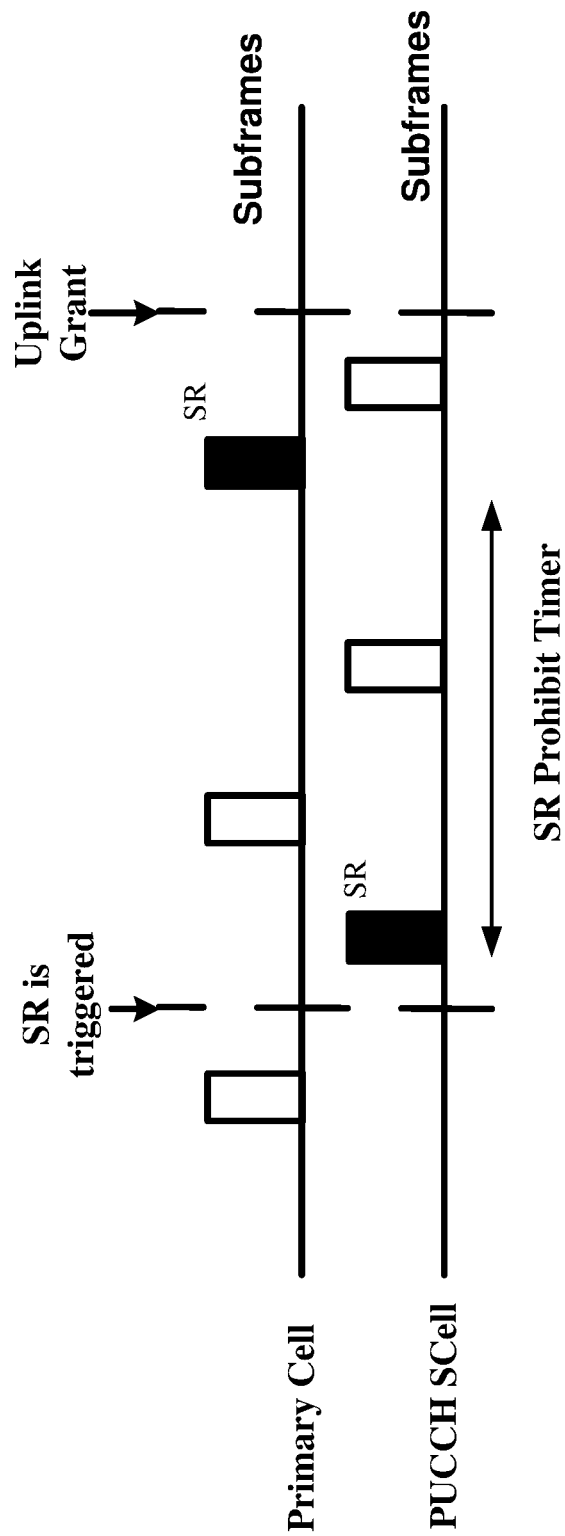
FIG. 15 is an example SR process as per an aspect of an embodiment of the present invention.

In an example implementation, SR resources may be interleaved in time domain, for example, some subframes (TTIs) may include a valid SR resource on PCell, and some other subframes may include a valid SR resource on the PUCCH SCell. In an example, as shown in FIG. 15, some TTIs may include a valid SR resource on the PCell, some TTIs may include a valid SR resource on the PUCCH SCell. In an example implementation, some TTIs may include a valid SR resource on both PCell and PUCCH SCell. When SR is configured on both an activated PUCCH SCell and a PCell, the MAC entity uses whichever SR resources comes first. When SR is triggered, it may be transmitted on the first valid SR resource available, regardless of whether SR resources is on PCell or SCell. When SR is on PUCCH SCell, there may be gain in terms of load balancing by allowing transmission of SR on an SCell. There may be some latency gain since there may be more SR resources available on the SCell. The UE may choose the first SR resources available for transmission of an SR. In an example, a valid SR resource on PCell and PUCCH SCell may overlap in time. A TTI may not include any valid SR resource or include more than one valid SR resources (on both PCell and PUCCH SCell). An eNB may employ different IEs for configuration of SR resources on PCell and PUCCH SCell. Example embodiments may be applicable to various SR configuration implementations on PCell and PUCCH SCell.

In an example embodiment, SR resources may be configured by one or more information elements in an RRC message. For example, SchedulingRequestConfig IE may be employed for configuration of PUCCH resources on the PCell and/or on a PUCCH SCell. The SchedulingRequestConfig IE may be used to specify some of the scheduling request related parameters. The SchedulingRequestConfig IE may be included in a dedicated physical layer configuration IE of a UE configuration.

The SchedulingRequestConfig IE may comprise an information element to set up or release scheduling resources and other parameters. SchedulingRequestConfig IE may comprise PUCCH resource Index (sr-ConfigIndex), SR configuration index (sr-ConfigIndex), and SR maximum transmission (dsr-TransMax) IEs. At least one RRC message may include a first SchedulingRequestConfig IE for configuration of SR resources on PCell, and a second SchedulingRequestConfig IE for configuration of SR resources on PUCCH SCell. sr-ConfigIndex may be configured and sr-PUCCH-ResourceIndex (e.g. sr-PUCCH-ResourceIndex, sr-PUCCH-ResourceIndexP1) may be configured. sr-PUCCH-ResourceIndex, sr-PUCCH-ResourceIndexP1 may be $n_{PUCCH,SRI}^{(1,p)}$ for antenna port P0 and for antenna port P1 respectively. E-UTRAN may configure sr-PUCCH-ResourceIndexP1 if sr-PUCCHResourceIndex is configured.

At least one RRC message configuring SR configuration may also include sr-ProhibitTimer IE to be employed to determine a timer value for scheduling request processes.

When an SR is triggered, the corresponding SR process may be considered as pending until it is cancelled. Pending SR(s) may be cancelled and sr-ProhibitTimer may be stopped when a MAC PDU is assembled and this PDU includes a BSR (Buffer Status Report) which contains buffer status up to (and including) the last event that triggered a BSR, or when the UL grant(s) can accommodate pending data available for transmission. If an SR is triggered and there is no other SR pending, the MAC entity may set the SR_COUNTER to 0.

As long as one SR is pending, the MAC entity and if no UL-SCH resources are available for a transmission in this TTI, and if the MAC entity has no valid PUCCH resource for SR configured in any TTI: UE (e.g. MAC entity) may initiate a Random Access procedure on the SpCell and cancel pending SRs. In an example embodiment, if SR resources are configured on a PUCCH SCell and the PUCCH SCell is deactivated, the MAC entity may not have a valid PUCCH resource for transmitting an SR signal on a deactivated PUCCH SCell. If SR resources is not configured on a PUCCH SCell, the MAC entity may not have a valid PUCCH resource for SR on the PUCCH SCell.

In an example embodiment, a UE may receive at least one RRC message comprising configuration parameters of one or more cells, the RRC message may comprise configuration parameters of scheduling request resources and processes. At least one RRC message may comprise a first SR maximum transmission information element (IE) for the PCell and a second SR maximum transmission information element for the PUCCH SCell. The at least one message may comprise a common SR prohibit timer information element which is used for both PCell and PUCCH SCell.

The at least one message may comprise a first scheduling request configuration index for scheduling request resources on the primary PUCCH, if SR resources on PCell is configured. The first scheduling request configuration index may indicate a first scheduling request period and a first offset as shown in example FIG. 14. The at least one message may further comprise a second scheduling request configuration index for scheduling request resources on the secondary PUCCH, if SR resources are configured for a PUCCH SCell. The second scheduling request configuration index may indicate a second scheduling request period and a second offset as shown in example FIG. 14.

In an example embodiment, an RRC message may comprise configuration parameters of SR resources on both a PCell and an SCell. In another example embodiment, a first RRC message may configuration parameters of SR resources on the PCell and a second RRC message may configuration parameters of SR resources on an SCell. The at least one RRC message may comprise the first RRC message and the second RRC message.

At least one RRC message configuring SR configuration may also include sr-ProhibitTimer information element comprising a timer value for scheduling request processes. The value of IE sr-ProhibitTimer may be in number of SR period(s). Value 0 means no timer for SR transmission on PUCCH is configured. Value 1 corresponds to one SR period, Value 2 corresponds to 2*SR periods and so on.

At least one RRC message configuring SR configuration may also include dsr-TransMax IE in SchedulingRequest-Config IE. In an example embodiment, dsr-TransMax may take the value of n4, n8, n16, n32, or n64. The value n4 corresponds to 4 transmissions, n8 corresponds to 8 transmissions and so on.

A UE may be configured by higher layers to transmit the SR on one antenna port or two antenna ports of the serving cell with configured PUCCH. The scheduling request may be transmitted on the PUCCH resource(s) $n_{PUCCH}^{(1,\tilde{p})} = n_{PUCCH,SRI}^{(1,\tilde{p})}$ for $\tilde{p}$ mapped to antenna port p, where $n_{PUCCH,SRI}^{(1,\tilde{p})}$ may be configured by higher layers unless the SR coincides in time with the transmission of HARQ-ACK using PUCCH Format 3 in which case the SR may be multiplexed with HARQ-ACK. The SR configuration for SR transmission periodicity $SR_{PERIODICITY}$ and SR subframe offset $N_{OFFSET,SR}$ may be defined, for example, as shown in FIG. 14 by the parameter sr-ConfigIndex $I_{SR}$ given by higher layers. SR transmission instances in a serving cell configured with SR are the uplink subframes satisfying $(10 \times n_f + \lfloor n_s/2 \rfloor - N_{OFFSET,SR}) \bmod SR_{PERIODICITY} = 0$.

In an example embodiment, SR resources may be configured by eNB in a way that TTIs with available SR resources in a PCell and an SCell do not overlap. The time difference between two subsequent subframes with SR resources may be reduced when SR resources are configured on both PCell and PUCCH SCell.

When an SR is triggered, it may be considered as pending until it is cancelled. Pending SR(s) may be cancelled and sr-ProhibitTimer may be stopped when a MAC PDU is assembled and this PDU includes a BSR (Buffer Status Report) which contains buffer status up to (and including) the last event that triggered a BSR, or when the UL grant(s) can accommodate pending data available for transmission. If an SR is triggered and there is no other SR pending, the MAC entity may set the SR_COUNTER to 0.

In an example embodiment, whether to configure scheduling request only on PCell, only on the PUCCH SCell, or on both PCell and PUCCH SCell is up to eNB implementation. When SR is configured on both activated PUCCH SCell and PCell, the MAC entity may use whichever SR opportunity comes first for SR transmission. Based on the UE implementation, the MAC entity may choose one of SRs when SRs are configured on PUCCH SCell(s) and PCell in the same TTI. In a MAC entity, there may be only one scheduling request procedure regardless of whether scheduling request is configured on multiple cells, e.g. one SR_COUNTER which is increased when SR is sent on either PCell or PUCCH SCell and one sr-ProhibitTimer.

In a wireless device, as long as one SR is pending, and if no UL-SCH resources are available for a transmission in this TTI, and if the MAC entity has no valid PUCCH resource for SR configured in any TTI: initiate a Random Access procedure and cancel pending SRs. In an example embodiment, if SR resources are configured on a PUCCH SCell and the PUCCH SCell is deactivated, the MAC entity may not have a valid PUCCH resource for SR on a deactivated PUCCH SCell. If SR is not configured on a PUCCH SCell, the MAC entity may not have a valid PUCCH resource for SR on the PUCCH SCell. If SR resources are configured on a PUCCH SCell and the TAT associated with the TAG of the PUCCH SCell is not running, the MAC entity may not have a valid PUCCH resource for transmitting SR on the PUCCH SCell. In an example embodiment, a PUCCH SCell has valid SR resources in a subframe, if SR is configured for the SCell in the subframe, the PUCCH SCell is activated in the subframe, and the TAT associated with the TAG of PUCCH SCell is running in the subframe. If TAT of a PUCCH SCell is expired, then PUCCH resources of the SCell is released and the PUCCH SCell is no longer considered an SCell with configured PUCCH and SR resources. SR resources may be configured for an SCell that is in a TAG that its TAT is not running. In such a case, the SCell does not have valid SR resources until the TAG is uplink synchronized. When SR resources are not configured for a serving cell, that serving cell does not have valid SR resources.

Various example scenarios when an SCell has valid or invalid SR resources are illustrated in FIGS. 16, 17, 18, and 19.

Figure 16:
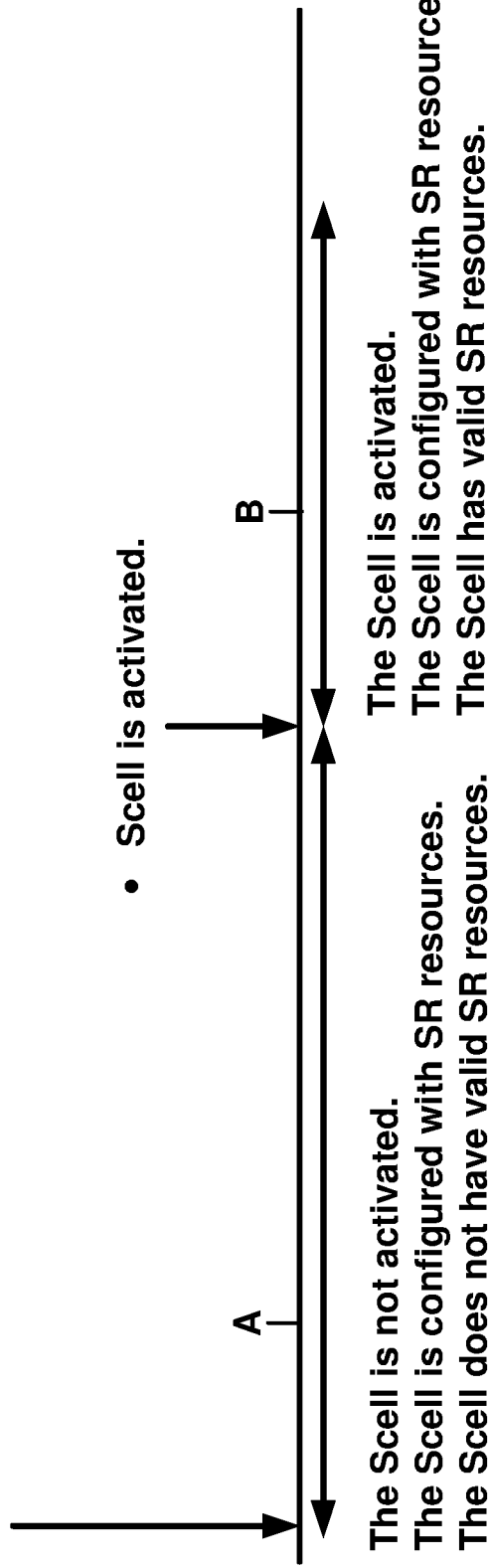
FIG. 16 shows example events and states corresponding to a secondary cell as per an aspect of an embodiment of the present invention.

FIG. 16 shows example events and states corresponding to a secondary cell as per an aspect of an embodiment of the present invention. When an SCell with configured PUCCH resources is deactivated, the SCell does not include valid SR resources. For example, subframe A does not have valid SR resources. In an example embodiment, a PUCCH SCell has valid SR resources in a subframe, if SR is configured for the SCell in the subframe, the PUCCH SCell is activated in the subframe, and the TAT associated with the TAG of PUCCH SCell is running in the subframe. For example, subframe B is configured with SR resources and include valid SR resources.

Figure 17:
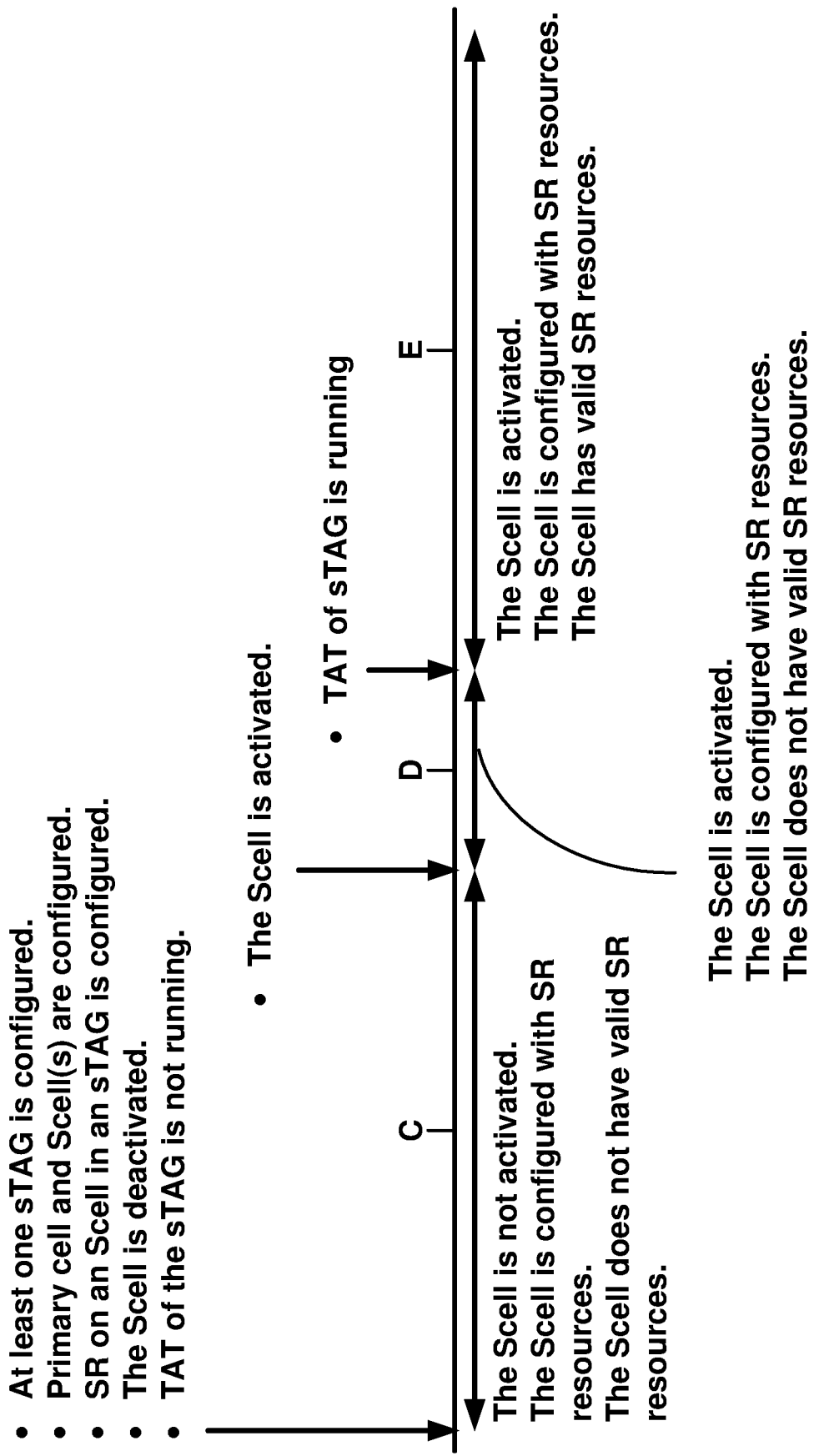
FIG. 17 shows example events and states corresponding to a secondary cell as per an aspect of an embodiment of the present invention.

FIG. 17 shows example events and states corresponding to a secondary cell as per an aspect of an embodiment of the present invention. When an SCell with configured PUCCH resources is deactivated, the SCell does not include valid SR resources. For example, subframe C does not have valid SR resources. When an SCell with configured PUCCH resources is activated but is in a TAG that its TAT is not running, the SCell does not include valid SR resources. For example, subframe D does not have valid SR resources. In an example embodiment, a PUCCH SCell has valid SR resources in a subframe, if SR is configured for the SCell in the subframe, the PUCCH SCell is activated in the subframe, and the TAT associated with the TAG of PUCCH SCell is running in the subframe. For example, subframe E is configured with SR resources and include valid SR resources.

In an example embodiment, a wireless device may receive at least one message comprising: i) first configuration parameters of a primary cell in a plurality of cells. The plurality of cells are grouped into a plurality of timing advance groups (TAGs) comprising a primary TAG and a secondary TAG. ii) second configuration parameters of a secondary cell, the secondary cell having configured second SR resources in a first plurality of subframes. The wireless device may receive a MAC activation command for activation of the secondary cell in the secondary TAG. The secondary TAG may have a timing alignment timer (TAT) that is not running. The wireless device may determine that the secondary cell has invalid SR resource in a subframe in the first plurality of subframes when: an SR is pending in the subframe; the TAT is not running in the subframe; and the second SR resources are configured in the subframe and the wireless device does not have any uplink data channel resources are available for transmission in the subframe.

In an example embodiment, a wireless device may receive at least one message comprising: i) first configuration parameters of a primary cell in a plurality of cells. The plurality of cells are grouped into a plurality of timing advance groups (TAGs) comprising a secondary TAG. ii) second configuration parameters of a secondary cell. The secondary cell has a configured second SR resources in a first plurality of subframes. The wireless device may receive a MAC activation command for activation of the secondary cell in the secondary TAG. The secondary TAG may have a timing alignment timer (TAT) that is not running. The wireless device may determine that the secondary cell has invalid SR resource in a subframe in the first plurality of subframes when: an SR is pending in the subframe; the TAT is not running in the subframe; and the second SR resources are configured in the subframe.

In an example embodiment, a UE may receive at least one RRC message comprising configuration parameters of scheduling request resources and processes. At least one RRC message may comprise a first Scheduling Request Configuration IE for PCell and a second Scheduling Request Configuration IE for an SCell. Scheduling Request Configuration IE(s) may comprise parameters (IEs) such as sr-PUCCH-ResourceIndex, sr-ConfigIndex, dsr-TransMax, and/or sr-PUCCH-ResourceIndexP1. The at least one RRC message may also comprise a MAC-Main configuration IE comprising a SR prohibit timer information element.

In an example embodiment, if the MAC entity has at least one valid PUCCH resource for SR configured for this TTI and if this TTI is not part of a measurement gap and if sr-ProhibitTimer is not running→If SR_COUNTER<dsr-TransMax, then UE may perform one or more of the following: UE may increment SR_COUNTER by 1; UE may instruct the physical layer to signal SR on one valid SR resource; and/or UE may start the sr-ProhibitTimer; Else UE may perform one, more than one, or all the following (this may be considered an SR failure): UE may notify RRC to release PUCCH/SRS for one or more first serving cells; UE may clear configured downlink assignments and uplink grants; and/or UE may initiate a Random Access procedure (e.g. on the PCell) and cancel pending SRs In an example embodiment, in a MAC entity, there may be only one scheduling request procedure regardless of whether scheduling request is configured on multiple cells, e.g. one SR_COUNTER which is increased when SR is sent on either PCell or PUCCH SCell and one sr-ProhibitTimer.

In an example embodiment, a UE may transmit an SR signal on a valid PUCCH resource for SR. A UE may initiate a Random Access procedure (e.g. on the PCell) and cancel all pending SRs, if the UE has no valid SR resource for SR configured in any TTI. A valid SR resource may be available for SR on a PCell or SPCell, when SR is configured on the cell. A valid SR resource may be available for SR on an SCell if SR resources are configured on the SCell, and if the SCell is activated and if TAT of the TAG associated with PUCCH SCell is running SR signal transmissions may not be allowed on a deactivated SCell. The SR resource on a deactivated SCell may be considered as an invalid SR resource. The SR resource on an SCell of a TAG that its TAT is not running may not be considered as a valid SR resource. The SR configuration, on SCell of a TAG when its TAT is expired, may be released. When SR configuration on a cell is released, SR resource is not available on the cell. In an example embodiment, valid SR resources for SR may include the SR resources configured on PCell that belong to a TAG that its TAT is running Valid SR resources for SR may include the SR resources configured on an activated PUCCH SCell that belong to a TAG that its TAT is running.

In an example embodiment, SR resources may be configured on an SCell but not on the PCell. If SR is triggered and PUCCH SCell is deactivated, Random Access may be triggered (e.g. on the PCell). SR resources on an SCell may not be released upon PUCCH SCell deactivation by a UE. In an example embodiment, SR resources may be configured on an SCell but not on the PCell. If SR is triggered and PUCCH SCell is activated in a TAG that its TAT is not running, Random Access may be triggered (e.g. on the PCell).

In an example embodiment, a wireless device may receive at least one RRC message comprising: i) first configuration parameters of a primary cell in a plurality of cells. The plurality of cells are grouped into a plurality of timing advance groups (TAGs) comprising a primary and a secondary TAG. The primary cell may have no scheduling request (SR) resources. ii) second configuration parameters of a secondary cell. The secondary cell may have configured second SR resources in a first plurality of subframes. The wireless device may receive a MAC activation command for activation of the secondary cell in the secondary TAG. The secondary TAG may have a timing alignment timer (TAT) that is not running. The wireless device may initiate a random access procedure when: an SR is pending in a subframe in the first plurality of subframes; the TAT is not running in the subframe; and no uplink data channel resources are available for transmission in the subframe. The second SR resources may be configured in the subframe.

In an example embodiment, a wireless device may receive at least one first RRC message comprising first configuration parameters of a primary cell in a plurality of cells. The plurality of cells being grouped into a plurality of timing advance groups (TAGs) comprising a secondary TAG. The primary cell has no scheduling request (SR) resources. The wireless device may receive at least one second message comprising second configuration parameters of a secondary cell in the secondary TAG. The secondary cell has configured second SR resources and is in activated state. The secondary TAG has a timing alignment timer (TAT) that is not running. The wireless device may initiate a random access procedure when: the secondary cell is activated; an SR is pending in a subframe; the TAT is not running in the subframe; and no uplink data channel resources are available for transmission in the subframe.

Various example scenarios when an SCell has valid or invalid SR resources are illustrated in FIGS. 16, 17, 18, and 19.

Figure 18:
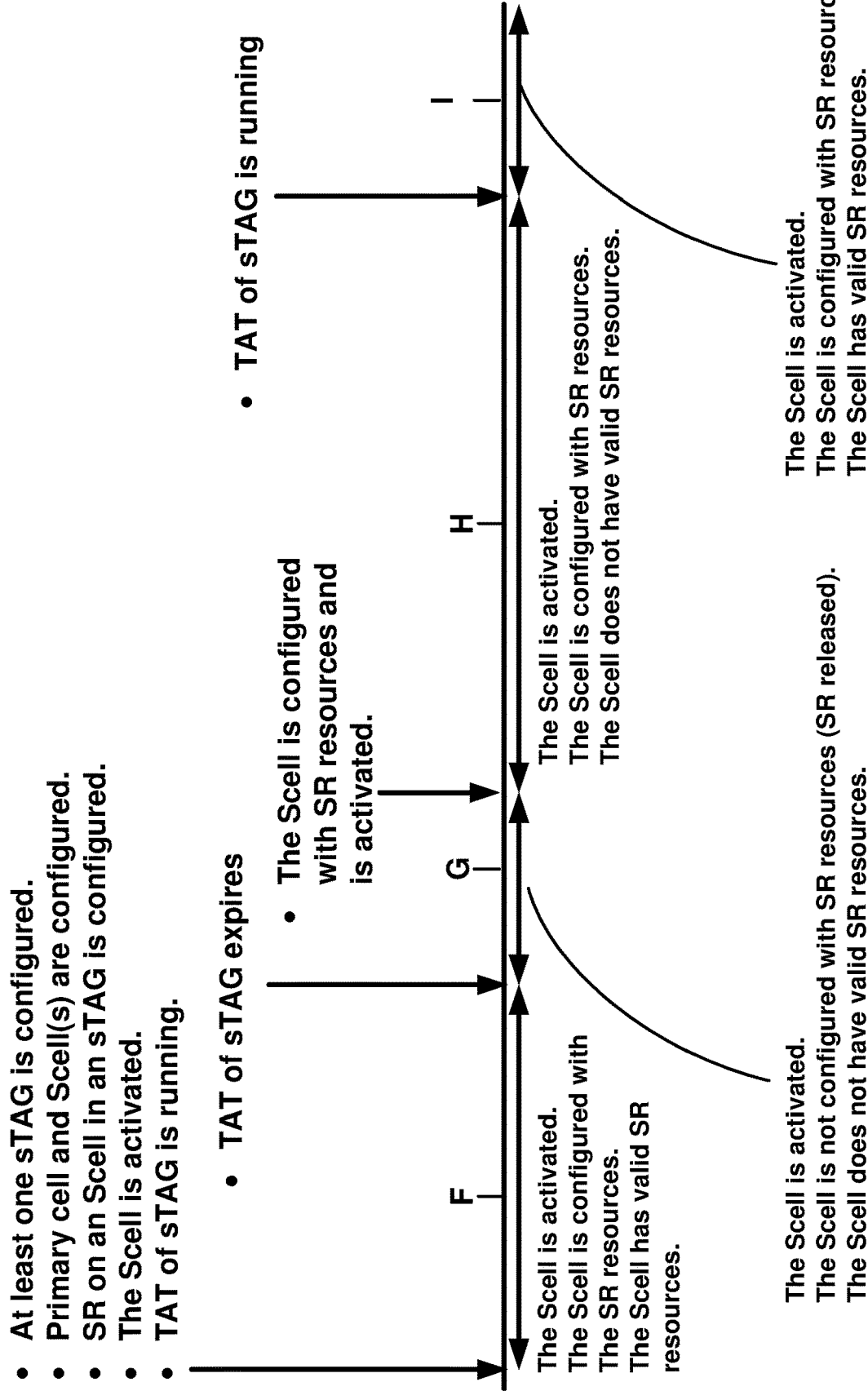
FIG. 18 shows example events and states corresponding to a secondary cell as per an aspect of an embodiment of the present invention.

FIG. 18 shows example events and states corresponding to a secondary cell as per an aspect of an embodiment of the present invention. When an SCell with configured PUCCH/SR resources is activated and uplink synchronized (corresponding TAT is running), the SCell includes valid SR resources. For example, subframe F may include valid SR resources. In an example embodiment, when the TAT of a TAG including the SCell expires, the UE/eNG may release PUCCH and SR resources on the SCell. The SCell may not have any valid SR resources. For example, subframe G may not have valid SR resources. The eNB may transmit one or more RRC messages to configure the SCell with PUCCH/ resources. The SCell may then be activated and have configured PUCCH/SR resources. The TAT of the TAG including the SCell may not be running, and the SCell may not include any valid SR resources. For example, subframe H may not have any valid SR resources. The eNB may initiate a random access process on the TAG. The PUCCH SCell has valid SR resources in a subframe, if SR is configured for the SCell in the subframe, the PUCCH SCell is activated in the subframe, and the TAT associated with the TAG of PUCCH SCell is running in the subframe. For example, subframe I is configured with SR resources and include valid SR resources.

Figure 19:
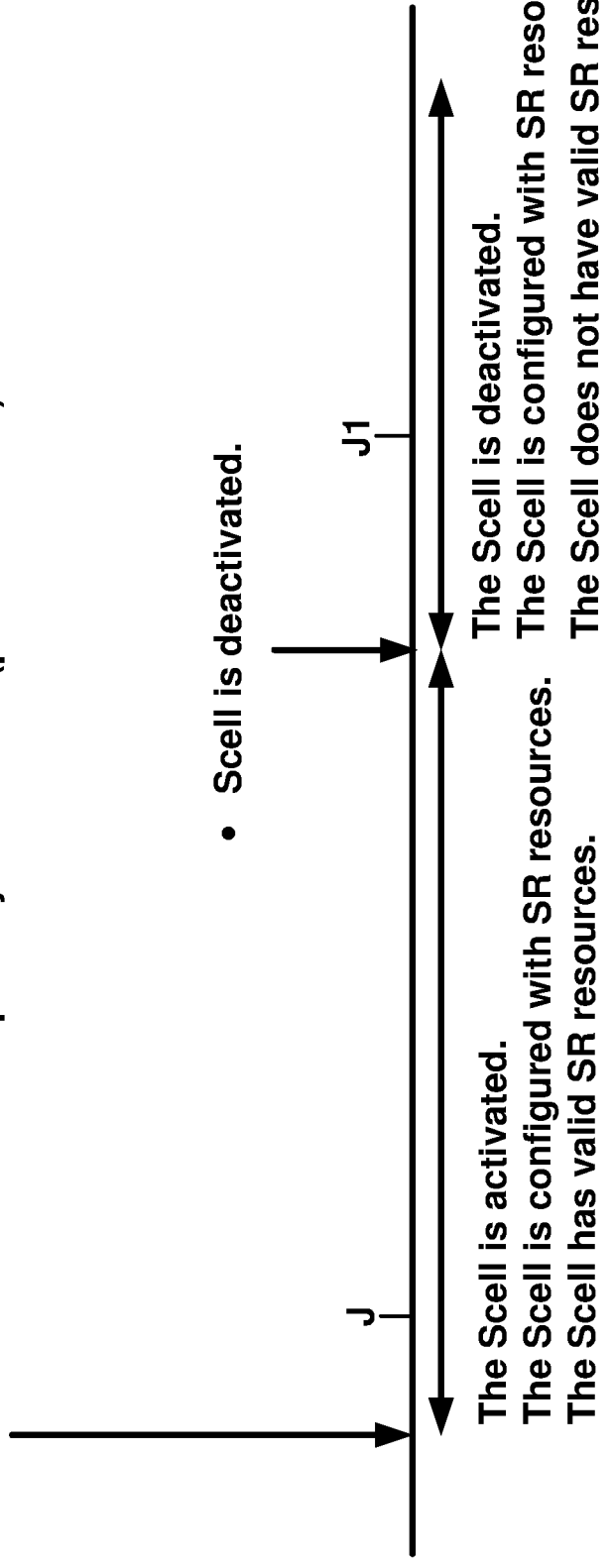
FIG. 19 shows example events and states corresponding to a secondary cell as per an aspect of an embodiment of the present invention.

FIG. 19 shows example events and states corresponding to a secondary cell as per an aspect of an embodiment of the present invention. The PUCCH SCell has valid SR resources in a subframe, if SR is configured for the SCell in the subframe, the PUCCH SCell is activated in the subframe, and the TAT associated with the TAG of PUCCH SCell is running in the subframe. For example, subframe J is configured with SR resources and include valid SR resources. A deactivated PUCCH SCell may not include a valid SR resources. For example, subframe J1 may not include any valid SR resources.

Figure 20:
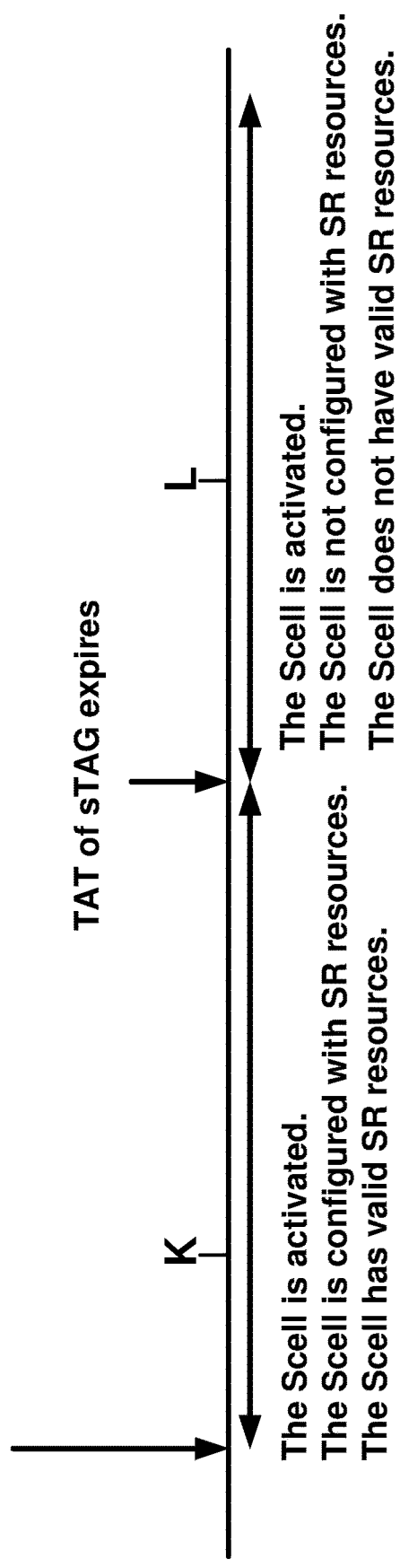
FIG. 20 shows example events and states corresponding to a secondary cell as per an aspect of an embodiment of the present invention.

FIG. 20 shows example events and states corresponding to a secondary cell as per an aspect of an embodiment of the present invention. The SCell with configured SR resources may belong to a TAG that its TAT is uplink synchronized. The PUCCH SCell has valid SR resources in a subframe, if SR is configured for the SCell in the subframe, the PUCCH SCell is activated in the subframe, and the TAT associated with the TAG of PUCCH SCell is running in the subframe. For example, subframe K is configured with SR resources and include valid SR resources. When TAT of the TAG expires, PUCCH of the SCell may be released and the SCell may not have valid SR resources. A PUCCH SCell that is not uplink synchronized (is out of sync) may not include a valid SR resources. For example, subframe L may not include any valid SR resources.

In example FIGS. 16, 17, 18, and 19 show various example events and states corresponding to a secondary cell as per an aspect of an embodiment of the present invention. In an example, in subframe A in FIG. 16, a wireless device may initiate a random access process when an SR is pending in subframe A and no uplink shared channel resources are available in subframe A. The same applies to subframes C, D, G, and H in FIG. 17 and FIG. 18. The wireless device may transmit an SR request when the PUCCH SCell has valid SR resources, for example, in subframe B, E, F, and I, when these subframes are configured with SR resources on the PUCCH SCell.

In an example embodiment, consider a scenario when SR resources are not configured on PCell and is configured on PUCCH SCell. The wireless device may transmit an SR on a valid SR resource of an SCell in a first subframe as a part of an SR process. In an example, in a second subframe after the first subframe, the PUCCH SCell may be deactivated for example because the wireless device received a MAC activation/deactivation command deactivating the PUCCH SCell. In another example, in a second subframe after the first subframe, a TAT of a timing advance group associated with the PUCCH SCell may expire. The wireless device may cancel the SR and initiate a random access process, if the SR process is pending in the second subframe and no uplink data channel resources are available for transmission in the second subframe. In an example embodiment, the wireless device may not wait for SR prohibit timer to expire before initiating the random access procedure. In an example embodiment, the wireless device may not wait for an uplink grant in response to the SR and may initiate the random access procedure.

For example, SR prohibit timer may be 80 msec. The wireless device may transmit an SR in subframe n. In subframe n+2, the wireless device may cancel SR process and initiate a random access process if the PUCCH SCell is deactivated and/or the TAT of the TAG associated with PUCCH SCell is expired. This process may reduce the delay for receiving an uplink grant.

In example FIG. 19 and FIG. 20, the wireless device may transmit an SR in subframes J and K. In FIG. 19, if an SR process is pending and SCell is deactivated and no uplink shared channel was not available to the wireless device, then the wireless device may initiate a random access process. In FIG. 20, if SR is pending and the TAT of the TAG associated with PUCCH SCell is expired and no uplink shared channel was not available to the wireless device, then the wireless device may initiate a random access process.

An eNB may or may not have received the SR request. The wireless device may not count on the eNB to the pending SR and may initiate the random access process. In some example scenarios, the eNB may receive both SR and the random access preamble.

In an example embodiment, a wireless device may receive at least one message comprising: a) first configuration parameters of a primary cell in a plurality of cells. The primary cell has no scheduling request (SR) resources. b) second configuration parameters of a secondary cell. The secondary cell has configured second SR resources. The wireless device may transmit an SR associated with an SR process in the second SR resources in a first subframe. The wireless device may monitor at least one downlink control channel for a grant for uplink data channel resources. The wireless device may cancel the SR process and initiate a random access procedure when: the SR process is pending; a TAT of a timing advance group associated with the secondary cell expires (the TAT is not running); and no uplink data channel resources are available for transmission.

In an example embodiment, a wireless device may receive at least one at least one message comprising: a) first configuration parameters of a primary cell in a plurality of cells. The primary cell has no scheduling request (SR) resources. b) second configuration parameters of a secondary cell. The secondary cell has configured second SR resources. The wireless device may transmit an SR associated with an SR process in the second SR resources in a first subframe. The wireless device may monitor at least one downlink control channel for a grant for uplink data channel resources. The wireless device may cancel the SR process and initiate a random access procedure when: the SR process is pending; said secondary cell is deactivated; no uplink data channel resources are available for transmission.

The random access procedures may be initiated by the UE on the PCell and may be a contention based random access procedure. SR resources may remain configured on the SCell during the random access procedures until and after the random access process is successful and UE is granted uplink resources. If a TAT of the sTAG including the SCell is not running, the eNB may trigger a random access process to uplink synchronize the secondary TAG. When the secondary TAG is uplink synchronized (its TAT is running), then UE may be able to employ the SR resources of the SCell to transmit SR request.

An eNB may configure SR of a UE on PCell or PUCCH SCell or both depending on many factors, e.g. the resource availability, reliability, and/or other implementation-related inputs.

In an example embodiment, MAC entity may consider that it has valid PUCCH resource in a subframe for SR in SCell, if PUCCH resource is configured in SCell in the subframe; and if the SCell is activated in the subframe and if TAT of the TAG associated with the SCell is running in the subframe. MAC entity considers it has valid PUCCH resource for SR in PCell/SPCell, if PUCCH resource is configured in PCell/SPCell (PCell/SPCell is always activated when configured).

MAC entity may not consider that it has valid PUCCH resource for SR in an SCell, if PUCCH resource is not configured in the SCell. In a subframe, MAC entity may not consider that it has valid PUCCH resource for SR in an SCell, if PUCCH resource is configured in the SCell in the subframe and the SCell is deactivated in the subframe. In a subframe, MAC entity may not consider that it has valid PUCCH resource for SR in an SCell, if PUCCH resource is configured in the SCell in the subframe and TAT of the TAG associated with the SCell is running in the subframe. A PUCCH SCell may be configured and then activated in a TAG that is not yet synchronized or is out-of-sync (its TAT is expired). In such scenarios, TAT of the TAG associated with PUCCH SCell is not running, while PUCCH resources and SR resources are configured. The UE (e.g. MAC entity) may not consider that the PUCCH SCell has a valid SR resources on the PUCCH SCell.

Figure 21:
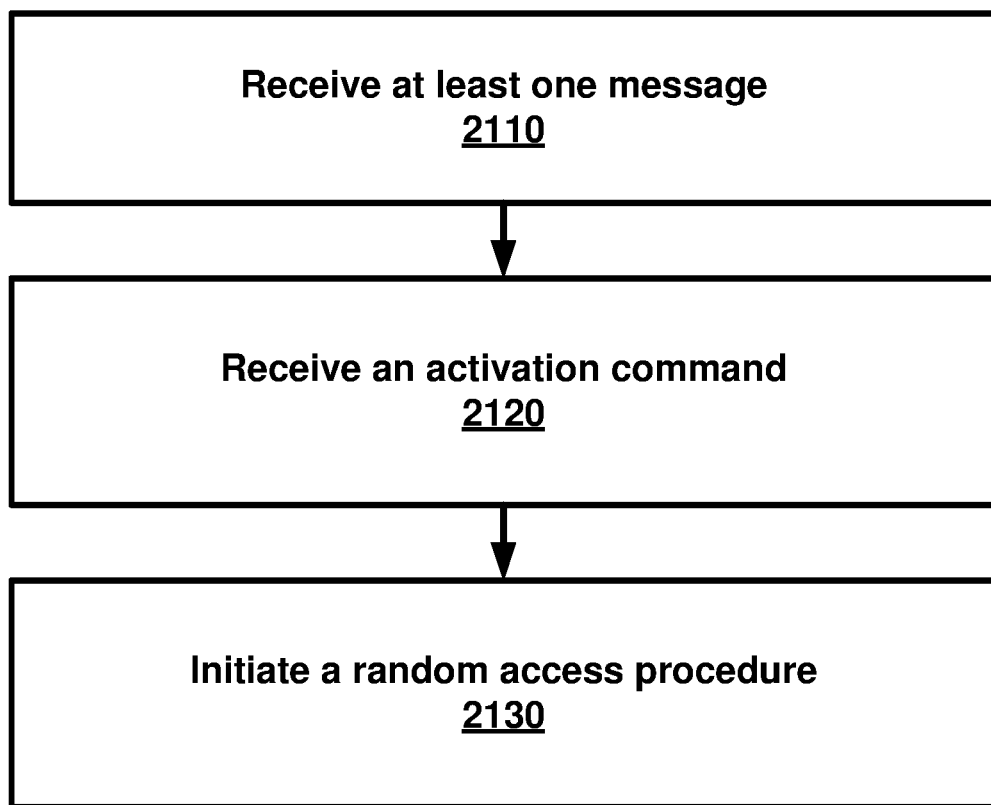
FIG. 21 is an example flow diagram as per an aspect of an embodiment of the present invention.

FIG. 21 is an example flow diagram as per an aspect of an embodiment of the present invention. A wireless device may receive at least one message from a base station at 2110. The wireless device may comprise one or more processors and memory storing instructions that, when executed, cause the wireless device to perform a method. The message(s) may comprise configuration parameters of a plurality of cells. According to an embodiment, the plurality of cells may be grouped into a plurality of physical uplink control channel (PUCCH) groups. The PUCCH groups may comprise a primary PUCCH group comprising the primary cell with a primary PUCCH transmitted to a base station. The PUCCH groups may comprise a secondary PUCCH group comprising the secondary cell with a secondary PUCCH transmitted to the base station. According to an embodiment, the configuration parameters may comprise: first configuration parameters of a primary PUCCH for the primary cell; and second configuration parameters of a secondary PUCCH for the secondary cell. The plurality of cells may comprise a primary cell and a secondary cell. The primary cell may have no configured scheduling request (SR) resources. The secondary cell may have configured SR resources. The secondary cell may be in a secondary timing advance group (sTAG). According to an embodiment, the SR resources may be configured on the secondary cell in the subframe.

According to an embodiment, the plurality of cells may be grouped into a plurality of timing advance groups (TAGs). The TAGs may comprise a primary TAG and an sTAG. The primary TAG may comprise the primary cell. The sTAG may comprise the secondary cell. According to an embodiment, the at least one message may comprise a time alignment timer parameter for the sTAG and a time alignment timer for the pTAG.

An activation command indicating activation of the secondary cell may be received by the wireless device from the base station at 2120. The secondary cell may be in an activated state in the subframe. According to an embodiment, the method may further comprise initiating the SR process when the wireless device has one or more uplink packets for transmission.

A random access procedure may be initiated at 2130. The random access procedure may be initiated when in the subframe an SR process is pending; no uplink data channel resources are available for transmission; and a time alignment timer of the sTAG is not running According to an embodiment, the method may further comprise transmitting a random access preamble in random access resources of the primary cell. According to an embodiment, the method may further comprise receiving a random access response comprising an uplink grant.

Figure 22:
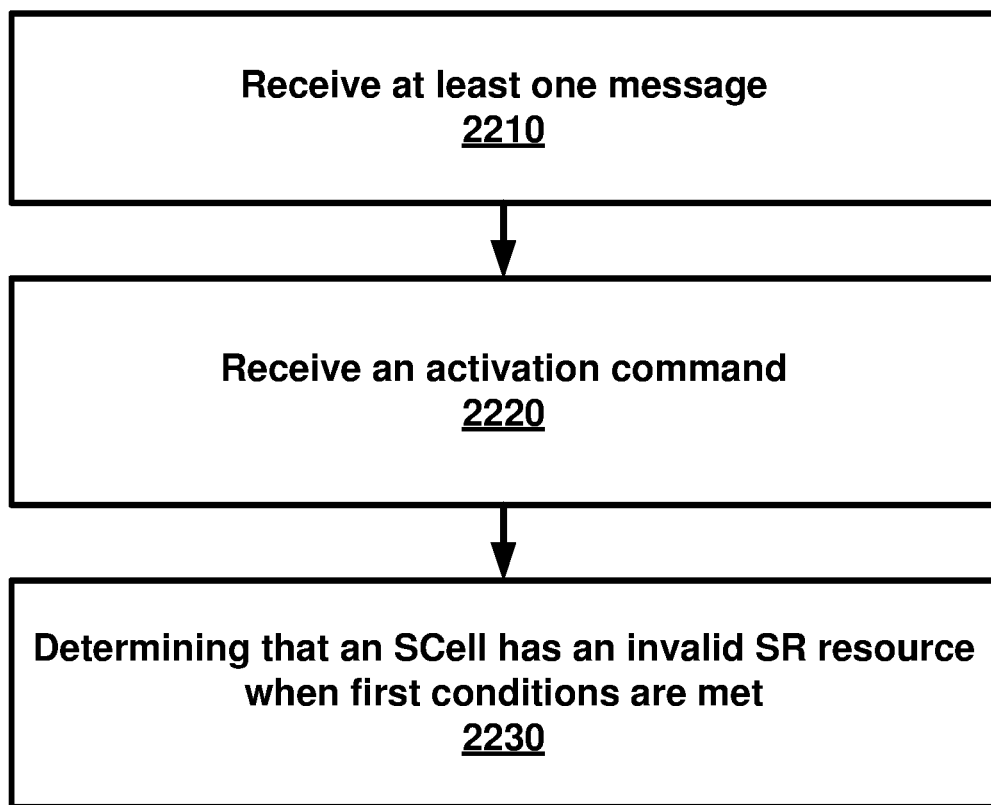
FIG. 22 is an example flow diagram as per an aspect of an embodiment of the present invention.

FIG. 22 is an example flow diagram as per an aspect of an embodiment of the present invention. A wireless device may receive at least one message at 2210. The wireless device may comprise one or more processors and memory storing instructions that, when executed, cause the wireless device to perform a method. The at least one message may comprise configuration parameters of a secondary cell configured with scheduling request (SR) resources. The secondary cell may be in a secondary timing advance group (sTAG).

According to an embodiment, the at least one message may comprise configuration parameters of a plurality of cells. The plurality of cells may be grouped into a plurality of physical uplink control channel (PUCCH) groups. The PUCCH groups may comprise a primary PUCCH group and a secondary PUCCH group. The primary PUCCH group may comprise a primary cell with a primary PUCCH transmitted to a base station. The secondary PUCCH group may comprise the secondary cell with a secondary PUCCH transmitted to the base station. According to an embodiment, the at least one message may comprise first configuration parameters of a primary PUCCH for a primary cell, and second configuration parameters of a secondary PUCCH for the secondary cell.

An activation command may be received at 2220. The activation command may indicate activation of the secondary cell. According to an embodiment, the secondary cell may be in an activated state in the subframe. According to an embodiment, the at least one message may comprise second configuration parameters of a plurality of cells. The plurality of cells may be grouped into a plurality of timing advance groups (TAGs). The plurality of TAGs may comprise: a primary TAG comprising a primary cell; and the sTAG comprising the secondary cell. According to an embodiment, the at least one message may comprise a time alignment timer parameter for the sTAG and a time alignment timer for the pTAG. According to an embodiment, the method may further comprise initiating the SR process when the wireless device has one or more uplink packets for transmission.

At 2230, the secondary cell may be determined to have an invalid SR resource when first conditions are met. For example, at 2230, the secondary cell may be determined to have an invalid SR resource when in a subframe: an SR process is pending; the SR resources are configured in the subframe; and a time alignment timer of the sTAG is not running in the subframe. According to an embodiment, the SR resources may be configured on the secondary cell in the subframe. According to an embodiment, no uplink data channel resources may be available for transmission in the subframe. According to an embodiment, the method may further comprise initiating a random access process on the primary cell when no uplink data channel resources are available for transmission in the subframe.

Figure 23:
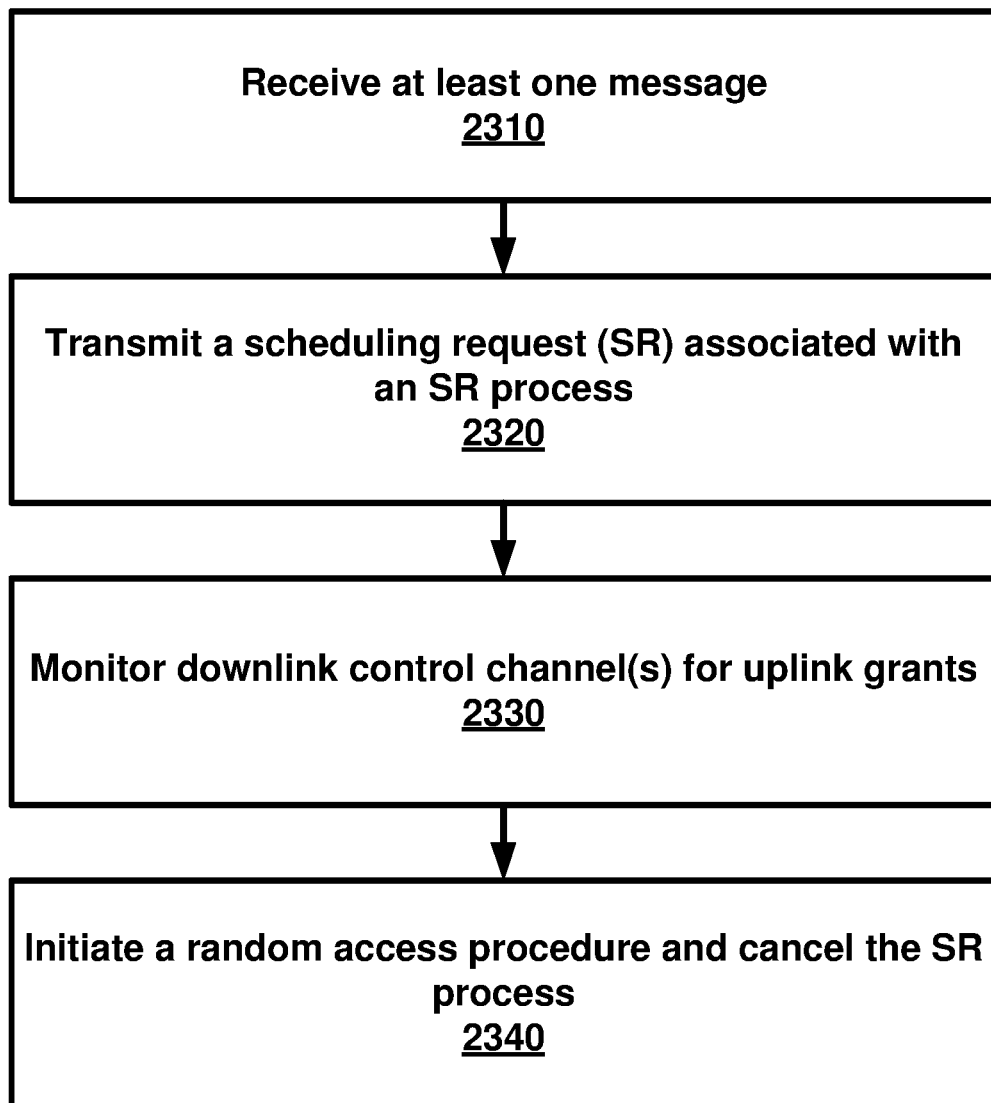
FIG. 23 is an example flow diagram as per an aspect of an embodiment of the present invention.

FIG. 23 is an example flow diagram as per an aspect of an embodiment of the present invention. A wireless device may receive at least one message at 2310. The wireless device may comprise one or more processors and memory storing instructions that, when executed, cause the wireless device to perform a method. The at least one message may comprise configuration parameters of a plurality of cells. The plurality of cells may comprise: a primary cell with no configured scheduling request (SR) resources; and a secondary cell with configured SR resources. The secondary cell may be in a secondary timing advance group (sTAG). According to an embodiment, the secondary cell may be in an activated state in the subframe.

According to an embodiment, the plurality of cells may be grouped into a plurality of physical uplink control channel (PUCCH) groups. The PUCCH groups may comprise a primary PUCCH group and a secondary PUCCH group. The primary PUCCH group may comprise the primary cell with a primary PUCCH transmitted to a base station. The secondary PUCCH group may comprise the secondary cell with a secondary PUCCH transmitted to the base station. According to an embodiment, the at least one message may comprise: first configuration parameters of a primary PUCCH for the primary cell; and second configuration parameters of a secondary PUCCH for the secondary cell.

According to an embodiment, the method may further comprise the wireless device initiating the SR process when the wireless device has one or more uplink packets for transmission. At 2320, an SR associated with an SR process may be transmitted in the SR resources. An SR prohibit timer may not be running.

At 2330, at least one downlink control channel may be monitored for uplink grants. At 2340, a random access procedure may be initiated and the SR process cancelled when in a subframe: the SR process is pending; no uplink data channel resources are available for transmission; and a time alignment timer of the sTAG is not running According to an embodiment, the plurality of cells may be grouped into a plurality of timing advance groups (TAGs). The TAGs may comprise a primary TAG and the sTAG. The primary TAG may comprise the primary cell. The sTAG may comprise the secondary cell. According to an embodiment, the at least one message may comprise a time alignment timer parameter for the sTAG and a time alignment timer for the pTAG. According to an embodiment, the method may further comprise transmitting a random access preamble in random access resources of the primary cell. According to an embodiment, the method may further comprise receiving a random access response comprising an uplink grant.

The configured set of serving cells for a UE may, according to some embodiments, comprise of one PCell and one or more SCells.

According to an embodiment, an IE PhysicalConfigDedicated element may be employed to specify UE specific physical channel configuration(s). According to an embodiment: PhysicalConfigDedicated may comprise SEQUENCE {schedulingRequestConfig SchedulingRequestConfig OPTIONAL, --Need ON [ . . . ]}. According to an embodiment: PhysicalConfigDedicatedSCell may comprise SEQUENCE {schedulingRequestConfig SchedulingRequestConfig OPTIONAL, --Need ON [ . . . ]}.

According to an embodiment, a Timing Advance Group may comprise a group of serving cells that may be configured by RRC and that, for the cells with an UL configured, use the same timing reference cell and the same Timing Advance value. A Primary Timing Advance Group may comprise a Timing Advance Group comprising the PCell. A Secondary Timing Advance Group may comprise a Timing Advance Group not containing the PCell.

According to an embodiment, the Activation/Deactivation MAC control element may be identified by a MAC PDU subheader with an LCID. The Scheduling Request (SR) may be employed for requesting UL-SCH resources for new transmission. When an SR is triggered, it may be considered as pending until it is cancelled. Pending SR(s) may be cancelled and sr-ProhibitTimer may be stopped when a MAC PDU is assembled and this PDU comprises a BSR which contains buffer status up to (and including) the last event that triggered a BSR. Pending SR(s) may be cancelled and sr-ProhibitTimer may be stopped if pending SR(s) are triggered by Sidelink BSR, when a MAC PDU is assembled and this PDU comprises a Sidelink BSR which comprises buffer status up to (and including) the last event that triggered a Sidelink BSR. Pending SR(s) may be cancelled and sr-ProhibitTimer may be stopped if pending SR(s) are triggered by Sidelink BSR, when upper layers configure autonomous resource selection. Pending SR(s) may be cancelled and sr-ProhibitTimer may be stopped when the UL grant(s) may accommodate pending data available for transmission.

According to an embodiment, if an SR is triggered and there is no other SR pending, the MAC entity may set an SR_COUNTER to 0. According to an embodiment, as long as one SR is pending, the MAC entity may for each TTI, if no UL-SCH resources are available for a transmission in this TTI, if the MAC entity has no valid PUCCH resource for SR configured in any TTI: initiate a Random Access procedure on the SpCell and cancel pending SRs. Else if the MAC entity has at least one valid PUCCH resource for SR configured for this TTI and if this TTI is not part of a measurement gap and if sr-ProhibitTimer is not running: if SR_COUNTER<dsr-TransMax: increment SR_COUNTER by 1; instruct the physical layer to signal the SR on one valid PUCCH resource for SR; and start the sr-ProhibitTimer. Else: notify RRC to release PUCCH for serving cells; notify RRC to release SRS for serving cells; clear any configured downlink assignments and uplink grants; and initiate a Random Access procedure on the SpCell and cancel pending SRs. The selection of which valid PUCCH resource for SR to signal SR on when the MAC entity has more than one valid PUCCH resource for SR in one TTI may be left to a UE implementation.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A method comprising:
    receiving, by a wireless device, configuration parameters of a plurality of cells, wherein the plurality of cells are grouped into a plurality of cell groups comprising:
        a primary cell group comprising a primary cell; and
        a secondary cell group comprising a secondary cell configured with uplink scheduling request (SR) resources;
    receiving an activation command indicating activation of the secondary cell; and
    determining that the secondary cell has an invalid uplink SR resource based on:
        at least one uplink SR pending in a time interval;
        the uplink SR resources being configured in the time interval; and
        a time alignment timer, associated with the secondary cell group, not running in the time interval.

2. The method of claim 1, wherein the plurality of cells are further grouped into a plurality of physical uplink control channel (PUCCH) groups comprising:
    a primary PUCCH group comprising the primary cell, wherein the primary cell is configured for a transmission of a primary PUCCH signal to a base station; and
    a secondary PUCCH group comprising the secondary cell, wherein the secondary cell is configured for a transmission of a secondary PUCCH signal to the base station.

3. The method of claim 1, wherein the plurality of cell groups comprises a plurality of timing advance groups (TAGs), wherein the primary cell group comprises a primary TAG, and wherein the secondary cell group comprises a secondary TAG.

4. The method of claim 1, wherein the secondary cell is in an activated state in the time interval.

5. The method of claim 1, further comprising receiving a random access response comprising an uplink grant.

6. The method of claim 1, wherein the uplink SR resources are configured, via the secondary cell, in the time interval.

7. The method of claim 1, wherein the configuration parameters of the plurality of cells comprise a time alignment timer parameter for the secondary cell group.

8. The method of claim 1, wherein the configuration parameters of the plurality of cells comprise:
    first configuration parameters of a primary PUCCH for the primary cell; and second configuration parameters of a secondary PUCCH for the secondary cell.

9. The method of claim 1, further comprising initiating the at least one uplink SR, based on the wireless device having one or more uplink packets for transmission.

10. The method of claim 1, wherein no uplink data channel resources are available for transmission in the time interval.

11. The method of claim 1, further comprising cancelling, based on the determining that the secondary cell has the invalid uplink SR resource, the at least one uplink SR.

12. The method of claim 1, wherein the primary cell does not have configured uplink SR resources.

13. The method of claim 1, further comprising, based on the determining that the secondary cell has the invalid uplink SR resource, performing at least one of:
   transmitting, via the primary cell, a preamble;
   initiating a random access procedure; or
   determining whether the wireless device is configured with valid uplink SR resources in a subsequent time interval.

14. A wireless device comprising:
   one or more processors; and
   memory storing instructions that, when executed by the one or more processors, cause the wireless device to:
      receive configuration parameters of a plurality of cells, wherein the plurality of cells are grouped into a plurality of cell groups comprising:
         a primary cell group comprising a primary cell; and
         a secondary cell group comprising a secondary cell configured with uplink scheduling request (SR) resources;
      receive an activation command indicating activation of the secondary cell; and
      determine that the secondary cell has an invalid uplink SR resource based on:
         at least one uplink SR pending in a time interval;
         the uplink SR resources being configured in the time interval; and
         a time alignment timer, associated with the secondary cell group not running in the time interval.

15. The wireless device of claim 14, wherein the plurality of cells are further grouped into a plurality of physical uplink control channel (PUCCH) groups comprising:
   a primary PUCCH group comprising the primary cell, wherein the primary cell is configured for a transmission of a primary PUCCH signal to a base station; and
   a secondary PUCCH group comprising the secondary cell, wherein the secondary cell is configured for a transmission of a secondary PUCCH signal to the base station.

16. The wireless device of claim 14, wherein the plurality of cell groups comprises a plurality of timing advance groups (TAGs), wherein the primary cell group comprises a primary TAG, and wherein the secondary cell group comprises a secondary TAG.

17. The wireless device of claim 14, wherein the secondary cell is in an activated state in the time interval.

18. The wireless device of claim 14, wherein the instructions, when executed by the one or more processors, further cause the wireless device to receive a random access response comprising an uplink grant.

19. The wireless device of claim 14, wherein the uplink SR resources are configured, via the secondary cell, in the time interval.

20. The wireless device of claim 14, wherein the configuration parameters of the plurality of cells comprise a time alignment timer parameter for the secondary cell group.

21. The wireless device of claim 14, wherein the configuration parameters of the plurality of cells comprise:
   first configuration parameters of a primary PUCCH for the primary cell; and
   second configuration parameters of a secondary PUCCH for the secondary cell.

22. The wireless device of claim 14, wherein the instructions, when executed by the one or more processors, further cause the wireless device to initiate the at least one uplink SR, based on the wireless device having one or more uplink packets for transmission.

23. The wireless device of claim 14, wherein no uplink data channel resources are available for transmission in the time interval.

24. The wireless device of claim 14, wherein the instructions, when executed by the one or more processors, further cause the wireless device to cancel, based on determining that the secondary cell has the invalid uplink SR resource, the at least one uplink SR.

25. The wireless device of claim 14, wherein the primary cell does not have configured uplink SR resources.

26. The wireless device of claim 14, wherein the instructions, when executed by the one or more processors, further cause the wireless device to perform, based on a determination that the secondary cell has the invalid uplink SR resource, at least one of:
   transmit, via the primary cell, a preamble;
   initiate a random access procedure; or
   determine whether the wireless device is configured with valid uplink SR resources in a subsequent time interval.

27. A system comprising:
   a base station comprising:
      one or more processors; and
      memory storing instructions that, when executed by the one or more processors of the base station, cause the base station to:
         transmit configuration parameters of a plurality of cells, wherein the plurality of cells are grouped into a plurality of cell groups comprising:
            a primary cell group comprising a primary cell; and
            a secondary cell group comprising a secondary cell configured with uplink scheduling request (SR) resources; and
         transmit an activation command indicating activation of the secondary cell; and
   a wireless device comprising:
      one or more processors; and
      memory storing instructions that, when executed by the one or more processors of the wireless device, cause the wireless device to:
         determine that the secondary cell has an invalid uplink SR resource based on:
            at least one uplink SR pending in a time interval;
            the uplink SR resources being configured in the time interval; and
            a time alignment timer, associated with the secondary cell group, not running in the time interval.

28. The system of claim 27, wherein the plurality of cells are further grouped into a plurality of physical uplink control channel (PUCCH) groups comprising:

a primary PUCCH group comprising the primary cell, wherein the primary cell is configured for a transmission of a primary PUCCH signal to the base station; and a secondary PUCCH group comprising the secondary cell, wherein the secondary cell is configured for a transmission of a secondary PUCCH signal to the base station.

29. The system of claim 27, wherein the plurality of cell groups comprises a plurality of timing advance groups (TAGs), wherein the primary cell group comprises a primary TAG, and wherein the secondary cell group comprises a secondary TAG.

30. The system of claim 27, wherein the secondary cell is in an activated state in the time interval.

31. The system of claim 27, wherein the instructions stored in the memory of the base station, when executed by the one or more processors of the base station, further cause the base station to transmit a random access response comprising an uplink grant.

32. The system of claim 27, wherein the uplink SR resources are configured, via the secondary cell, in the time interval.

33. The system of claim 27, wherein the configuration parameters of the plurality of cells comprise a time alignment timer parameter for the secondary cell group.

34. The system of claim 27, wherein the configuration parameters of the plurality of cells comprise:

first configuration parameters of a primary PUCCH for the primary cell; and second configuration parameters of a secondary PUCCH for the secondary cell.

35. The system of claim 27, wherein the instructions stored in the wireless device, when executed by the one or more processors of the wireless device, further cause the wireless device to initiate the at least one uplink SR, based on the wireless device having one or more uplink packets for transmission.

36. The system of claim 27, wherein no uplink data channel resources are available for transmission in the time interval.

37. The system of claim 27, wherein the instructions stored in the memory of the wireless device, when executed by the one or more processors of the wireless device, further cause the wireless device to cancel, based on determining that the secondary cell has the invalid uplink SR resource, the at least one uplink SR.

38. The system of claim 27, wherein the primary cell does not have configured uplink SR resources.

39. The system of claim 27, wherein the instructions stored in the memory of the wireless device, when executed by the one or more processors of the wireless device, further cause the wireless device to perform, based on a determination that the secondary cell has the invalid uplink SR resource, at least one of:

transmit, via the primary cell, a preamble;
initiate a random access procedure; or
determine whether the wireless device is configured with valid uplink SR resources in a subsequent time interval.

40. A computer readable medium storing instructions that, when executed, cause a wireless device to:

receive configuration parameters of a plurality of cells, wherein the plurality of cells are grouped into a plurality of cell groups comprising:

a primary cell group comprising a primary cell; and a secondary cell group comprising a secondary cell configured with uplink scheduling request (SR) resources;

receive an activation command indicating activation of the secondary cell; and determine that the secondary cell has an invalid uplink SR resource based on:

at least one uplink SR pending in a time interval;

the uplink SR resources being configured in the time interval; and a time alignment timer, associated with the secondary cell group, not running in the time interval.

41. The computer readable medium of claim 40, wherein the plurality of cells are further grouped into a plurality of physical uplink control channel (PUCCH) groups comprising:

a primary PUCCH group comprising the primary cell, wherein the primary cell is configured for a transmission of a primary PUCCH signal to a base station; and a secondary PUCCH group comprising the secondary cell, wherein the secondary cell is configured for a transmission of a secondary PUCCH signal to the base station.

42. The computer readable medium of claim 40, wherein the plurality of cell groups comprises a plurality of timing advance groups (TAGs), wherein the primary cell group comprises a primary TAG, and wherein the secondary cell group comprises a secondary TAG.

43. The computer readable medium of claim 40, wherein the secondary cell is in an activated state in the time interval.

44. The computer readable medium of claim 40, wherein the instructions, when executed, further cause the wireless device to receive a random access response comprising an uplink grant.

45. The computer readable medium of claim 40, wherein the uplink SR resources are configured, via the secondary cell, in the time interval.

46. The computer readable medium of claim 40, wherein the configuration parameters of the plurality of cells comprise a time alignment timer parameter for the secondary cell group.

47. The computer readable medium of claim 40, wherein the configuration parameters of the plurality of cells comprise:

first configuration parameters of a primary PUCCH for the primary cell; and second configuration parameters of a secondary PUCCH for the secondary cell.

48. The computer readable medium of claim 40, wherein the instructions, when executed, further cause the wireless device to initiate the at least one uplink SR, based on the wireless device having one or more uplink packets for transmission.

49. The computer readable medium of claim 40, wherein no uplink data channel resources are available for transmission in the time interval.

50. The computer readable medium of claim 40, wherein the instructions, when executed, further cause the wireless device to cancel, based on determining that the secondary cell has the invalid uplink SR resource, the at least one uplink SR.

51. The computer readable medium of claim 40, wherein the primary cell does not have configured uplink SR resources.

52. The computer readable medium of claim 40, wherein the instructions, when executed, further cause the wireless device to perform, based on a determination that the secondary cell has the invalid uplink SR resource, at least one of:
  transmit, via the primary cell, a preamble;
  initiate a random access procedure; or
  determine whether the wireless device is configured with valid uplink SR resources in a subsequent time interval.

* * * * *

UNITED STATES PATENT AND TRADEMARK OFFICE
CERTIFICATE OF CORRECTION

PATENT NO. : 10,701,719 B2
APPLICATION NO. : 16/281986
DATED : June 30, 2020
INVENTOR(S) : Esmael Dinan Page 1 of 2

It is certified that error appears in the above-identified patent and that said Letters Patent is hereby corrected as shown below:

On the Title Page

Item (71):
Please delete "Communication," and insert --Communications,--

In the Specification

Column 17, Line 6:
After "running", please insert --,--

Column 18, Line 24-25:
Please delete "sr-PUCCH-ResourceLindexP1" and insert --sr-PUCCH-ResourceIndexP1--

Column 18, Line 25:
Please delete "sr-PUCCH-ResourceLindexP1" and insert --sr-PUCCH-ResourceIndexP1--

Column 21, Line 67:
After "running", insert --,--

Column 22, Line 10:
After "running", insert --,--

Column 26, Line 12:
After "running", insert --,--

Column 27, Line 40:
After "running", insert --,--

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,701,719 B2

In the Claims

Column 31, Line 43:
Claim 14, after "group", please insert --,--